(12) United States Patent
Dabouineau et al.

(10) Patent No.: US 11,525,933 B2
(45) Date of Patent: Dec. 13, 2022

(54) WIRELESS SEISMIC ACQUISITION NODE AND METHOD

(71) Applicant: SERCEL, Carquefou (FR)

(72) Inventors: Johann Dabouineau, Villeneuve de riviere (FR); Bertrand Tijou, Mauves sur loire (FR); Christian Gregoire, La chapelle sur erdre (FR); Cyrille Bernard, Saint-Philibert de Grand-Lieu (FR); Pagnarit Seng, Cazères (FR)

(73) Assignee: SERCEL, Carquefou (FR)

(*) Notice: Subject to any disclaimer, the term of this patent is extended or adjusted under 35 U.S.C. 154(b) by 631 days.

(21) Appl. No.: 16/569,755

(22) Filed: Sep. 13, 2019

(65) Prior Publication Data
US 2021/0080603 A1 Mar. 18, 2021

(51) Int. Cl.
G01S 1/22 (2006.01)
G01V 1/22 (2006.01)
G01V 1/16 (2006.01)
G01V 1/18 (2006.01)

(52) U.S. Cl.
CPC .............. G01V 1/223 (2013.01); G01V 1/164 (2013.01); G01V 1/181 (2013.01)

(58) Field of Classification Search
None
See application file for complete search history.

(56) References Cited

U.S. PATENT DOCUMENTS

| 5,253,223 A | 10/1993 | Svenning et al. |
| 7,195,505 B1 | 3/2007 | Becker |
| 7,668,044 B2 | 2/2010 | Brinkman et al. |
| 7,725,264 B2 | 5/2010 | Pavel et al. |
| 8,547,796 B2 | 10/2013 | Wilcox et al. |
| 2005/0134003 A1 | 6/2005 | Bryde et al. |
| 2005/0246137 A1 | 11/2005 | Brinkman et al. |
| 2005/0276162 A1 | 12/2005 | Brinkmann et al. |

(Continued)

FOREIGN PATENT DOCUMENTS

| CN | 101944694 A | 1/2011 |
| CN | 3075873 A1 | 3/2019 |

(Continued)

OTHER PUBLICATIONS

US Office Action for related U.S. Appl. No. 16/569,855 dated Feb. 6, 2020 (Except for the references cited herein, the remaining references cited in the US Office Action are already of record.).

(Continued)

Primary Examiner — Hovhannes Baghdasaryan
(74) Attorney, Agent, or Firm — Patent Portfolio Builders PLLC

(57) ABSTRACT

A seismic node for collecting seismic data, the seismic node including a base configured to define a chamber having an open face; a main electronic board having a processor, the main electronic board being placed inside the chamber; a battery pack configured to supply electrical power to the main electronic board and placed inside the chamber; and a digital cover that attaches to the open side of the base to seal the chamber, and a sensor device located inside the chamber and attached to a wall of the base to form a digital field unit, or an analog cover that attaches to the open side of the base to seal the chamber, and an analog sensor electrically attached to the analog cover to form an analog field unit.

19 Claims, 20 Drawing Sheets

(56) References Cited

U.S. PATENT DOCUMENTS

| | | |
|---|---|---|
| 2009/0086797 A1 | 4/2009 | Wilcox |
| 2009/0093687 A1 | 4/2009 | Telfort et al. |
| 2012/0008460 A1 | 1/2012 | Crice |
| 2013/0300266 A1 | 11/2013 | Ramey et al. |
| 2013/0336092 A1 | 12/2013 | Pennec et al. |
| 2014/0126327 A1 | 5/2014 | Swier et al. |
| 2014/0126329 A1 | 5/2014 | Guyton et al. |
| 2014/0219051 A1 | 8/2014 | Pavel |
| 2014/0379129 A1 | 12/2014 | Edsinger et al. |
| 2015/0171793 A1 | 6/2015 | Regier |
| 2015/0355610 A1 | 12/2015 | Petrocy et al. |
| 2016/0011324 A1 | 1/2016 | Hamon et al. |
| 2016/0224057 A1 | 8/2016 | Ecker et al. |
| 2017/0299740 A1 | 10/2017 | Guyton et al. |
| 2018/0341033 A1 | 11/2018 | Olivier et al. |
| 2020/0241156 A1 | 7/2020 | Contant et al. |
| 2020/0318462 A1 | 10/2020 | Ross et al. |
| 2021/0063483 A1 | 3/2021 | Hermann |
| 2021/0080599 A1 | 3/2021 | Gregoire et al. |
| 2021/0080603 A1 | 3/2021 | Dabouineau et al. |

FOREIGN PATENT DOCUMENTS

| | | |
|---|---|---|
| EP | 1995609 A1 | 11/2008 |
| EP | 2677346 A1 | 12/2013 |
| FR | 2981212 B1 | 11/2013 |
| WO | 2013015795 A1 | 1/2013 |
| WO | 2021048630 A1 | 3/2021 |

OTHER PUBLICATIONS

Invitation to Pay Additional Fees with Partial Search Report dated Jan. 12, 2021 in related/corresponding PCT Application No. PCT/IB2020/000762.

PCT International Search Report and Written Opinion of the International Searching Authority (Forms PCT/ISA/220, PCT/ISA/210 and PCT/ISA/237) for corresponding/related International Application No. PCT/IB2020/000763 dated Jan. 13, 2021.

PCT International Search Report and Written Opinion of the International Searching Authority (Forms PCT/ISA/220, PCT/ISA/210 and PCT/ISA/237) for corresponding/related International Application No. PCT/IB2020/000775 dated Jan. 18, 2021. (US-2005/0246137-A1 was previously cited in the Information Disclosure Statement filed on Jan. 21, 2021.).

PCT International Search Report and Written Opinion of the International Searching Authority (Forms PCT/ISA/220, PCT/ISA/210 and PCT/ISA/237) for corresponding/related International Application No. PCT/IB2020/000762 dated Mar. 22, 2021.

Advisory Action in related/corresponding U.S. Appl. No. 16/569,855 dated Dec. 1, 2020.

Office Action in related/corresponding U.S. Appl. No. 16/569,846 dated Jul. 8, 2022.

WIRELESS SEISMIC ACQUISITION NODE AND METHOD

BACKGROUND

Technical Field

Embodiments of the subject matter disclosed herein generally relate to a wireless seismic acquisition node, and more particularly, to a housing of the wireless seismic acquisition node that can be selectively configured as a digital field unit or as an analog field unit.

Discussion of the Background

Land seismic data acquisition and processing generate a profile (image) of a geophysical structure under the earth's surface, which is known as the subsurface. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration to determine the properties of earth's subsurface, which is especially helpful in the oil and gas industry. Land reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A seismic acquisition system for recording the reflections of the seismic waves, off the geological structures present in the subsurface, makes use of seismic nodes. The seismic nodes are capable of providing good data because of their wide-azimuth geometry. Wide-azimuth coverage is helpful for imaging beneath complex overburdens such as those associated with salt bodies. In addition, the seismic nodes can provide multi-component data, i.e., particle motion related data along one, two, or three different directions. In one application, a seismic node can also record pressure data, in addition to the particle motion data. However, the pressure data is a one-dimensional data while the particle motion data can be three-dimensional.

An example of a seismic acquisition system that uses autonomous land nodes is show in FIG. 1, and this system is manufactured by the assignee of this application, and is disclosed in U.S. Pat. No. 8,547,796, the entire content of which is incorporated herein by reference. The system 100 includes plural remote acquisition units (RAU) 110 that are distributed over an area 102 of interest. Each RAU 110 is configured to indirectly communicate with a general controller 126, which is also located in the area of interest 102. For transmitting the information from the general controller 126 to the RAU units 110 or vice versa, an aircraft 124 is flown over the RAU units for directly communicating with them. The aircraft 124 may be replaced by any other device (called herein a harvester) that is capable of moving across the area of interest 102 for interacting with the RAU units. The harvester 124 then travels to the general controller 126 for exchanging information.

The RAU units are self-powered by an internal power source, such as a battery 120 shown in FIG. 2. Each RAU includes a transceiver 122 that is configured to communicate in a wireless manner with the aircraft 124. The RAU 110 further includes an analog-to-digital (AD) converter 114 and a memory 116 for storing the recorded seismic information. The AD converter 114 can be configured to perform a high-precision conversion of the analog signal received from one or more analog sensors 112, for example, geophones. Note that the sensors 112 are located outside a housing 111 of the RAU 110. The memory 116 can be any type of memory. The RAU 110 also includes a time reference module 118, which may be implemented as a GPS receiver capable of deriving an accurate time reference from GPS signals. After the RAU 110 captures and stores the seismic data from the sensors 112, the harvester 124 may pass by to collect such data after which the data collected from all the RAU units is transferred to the general controller 126.

However, this and other existing land seismic nodes are bulky, not easy to manipulate, and require most of the time some level of disassembling for reaching the batteries and recharging them. In addition, all the current seismic acquisition systems use different housings for digital units and analog units, which require different manufacturing processes and many different parts. In addition, the process of recharging the seismic nodes, at the end of the seismic survey is complicated as the digital nodes need to be recovered together and recharged at one recharging station while the analog units need to be separated from the digital units and recharged at another recharging station.

Thus, there is a need for a single seismic node that is easy to manipulate when deployed or recovered, does not need to be disassembled for being recharged or having its data transferred to a server, and also can be reconfigured into different type of nodes, i.e., digital or analog, with minimal handling and mainly the same internal components.

BRIEF SUMMARY OF THE INVENTION

According to an embodiment, there is a seismic node for collecting seismic data, and the seismic node includes a base configured to define a chamber having an open face, a main electronic board having a processor, the main electronic board being placed inside the chamber, a battery pack configured to supply electrical power to the main electronic board and placed inside the chamber, either a digital cover that attaches to the open side of the base to seal the chamber, and a sensor device located inside the chamber and attached to a wall of the base to form a digital field unit, or an analog cover that attaches to the open side of the base to seal the chamber, and an analog sensor electrically attached to the analog cover to form an analog field unit.

According to still another embodiment, there is a seismic acquisition system for collecting seismic data. The seismic acquisition system includes a digital field unit, DFU, that collects a first set of seismic data, and an analog field unit, AFU, that collects a second set of seismic data. The DFU includes a first base and a digital cover, the AFU includes a second base and an analog cover, and the first base is identical to the second base.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
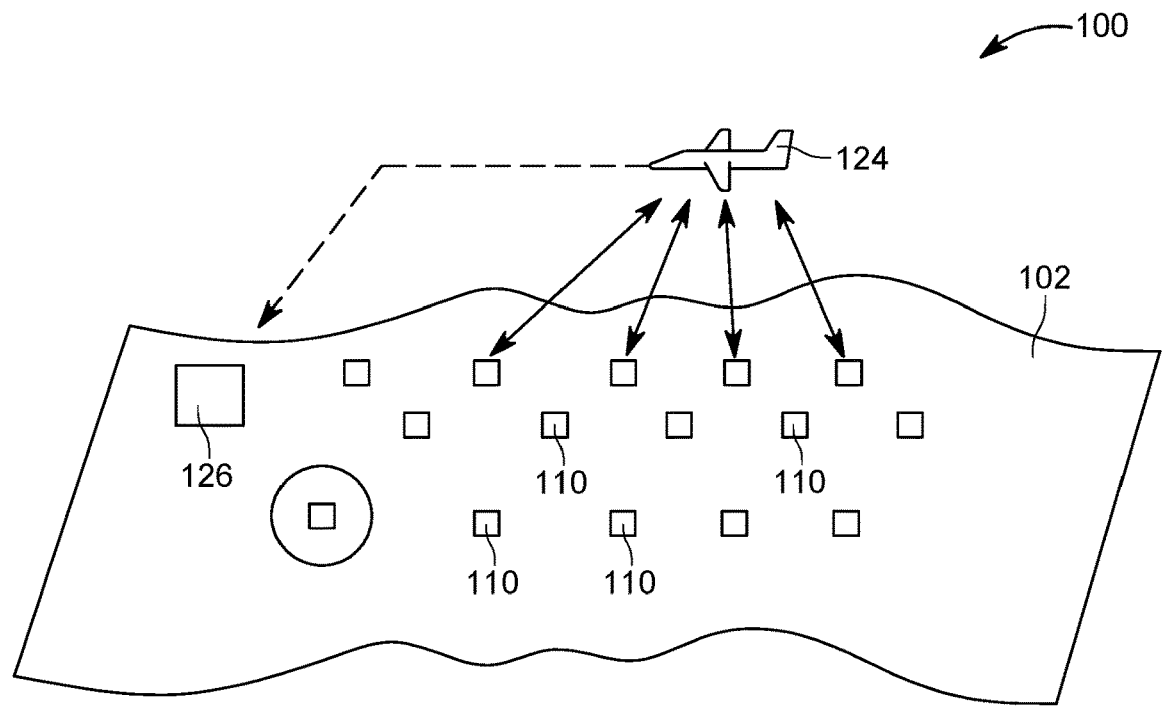
FIG. 1 is a schematic illustration of a traditional seismic acquisition system that includes plural seismic nodes.
Figure 2:
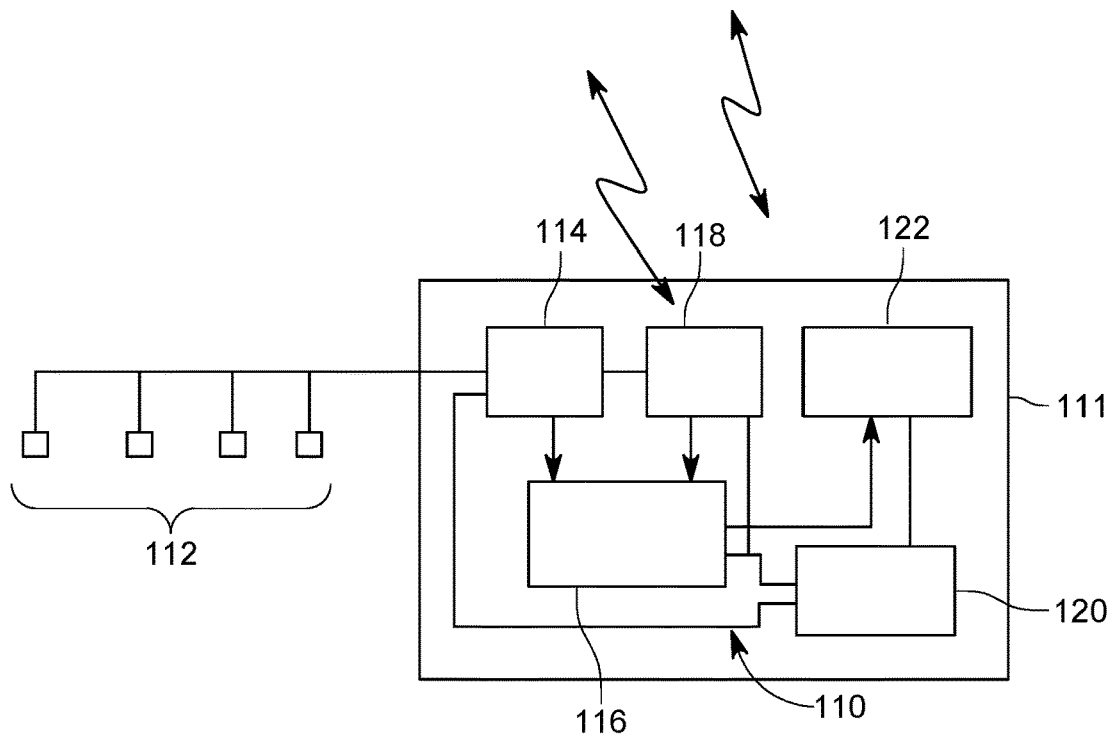
FIG. 2 is a schematic illustration of a traditional seismic node.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a housing of a wireless seismic node that can be reconfigured between an analog field unit and a digital field unit. However, the embodiments to be discussed next are not limited to only a wireless digital or analog seismic node, but may be applied to a wired seismic node or to other type of nodes.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a wireless seismic node has a housing that is made of two parts, a base (or bottom part) and a cover (top part). The base is configured to be common for both an analog field unit (AFU) and a digital field unit (DFU), thus simplifying the manufacturing process of these units. In this regard, an AFU node is configured to record and store analog signals related to the seismic data while a DFU node is configured to record and store digital signals related to the seismic data. The analog sensor or digital sensor are located inside or outside the node. In one embodiment, the AFU node has seismic sensors only outside the housing while the DFU node has the seismic sensor(s) only inside the housing. In another embodiment, it is possible to have the seismic sensors both inside or outside the housing. The AFU and DFU nodes differ not only in the analog and digital sensor type, but also in their plugs that allow communication with a recharging docking module.

An AFU node is configured to be connected to one or more sensors that are located outside the AFU node while the DFU node includes one or more sensors inside the housing. In one embodiment, the AFU node has seismic sensors only outside the housing while the DFU node has the seismic sensor(s) only inside the housing. In another embodiment, it is possible to have the seismic sensors both inside and outside the same housing. The AFU and DFU nodes differ not only in the analog and digital signals that are stored, but also in their plugs that allow communication with a recharging docking module. Depending on which type of unit is implemented, the cover is different and unique for each type of unit. While most of the inside electronics is shared by the AFU and DFU nodes, the sensors are not. Each of the AFU and DFU nodes are configured to autonomously, wirelessly, communicate with an external device, for example, a server or a harvesting device, and also to autonomously collect the seismic data. Each of the AFU and DFU nodes may be used for land acquisition.

Figure 3:
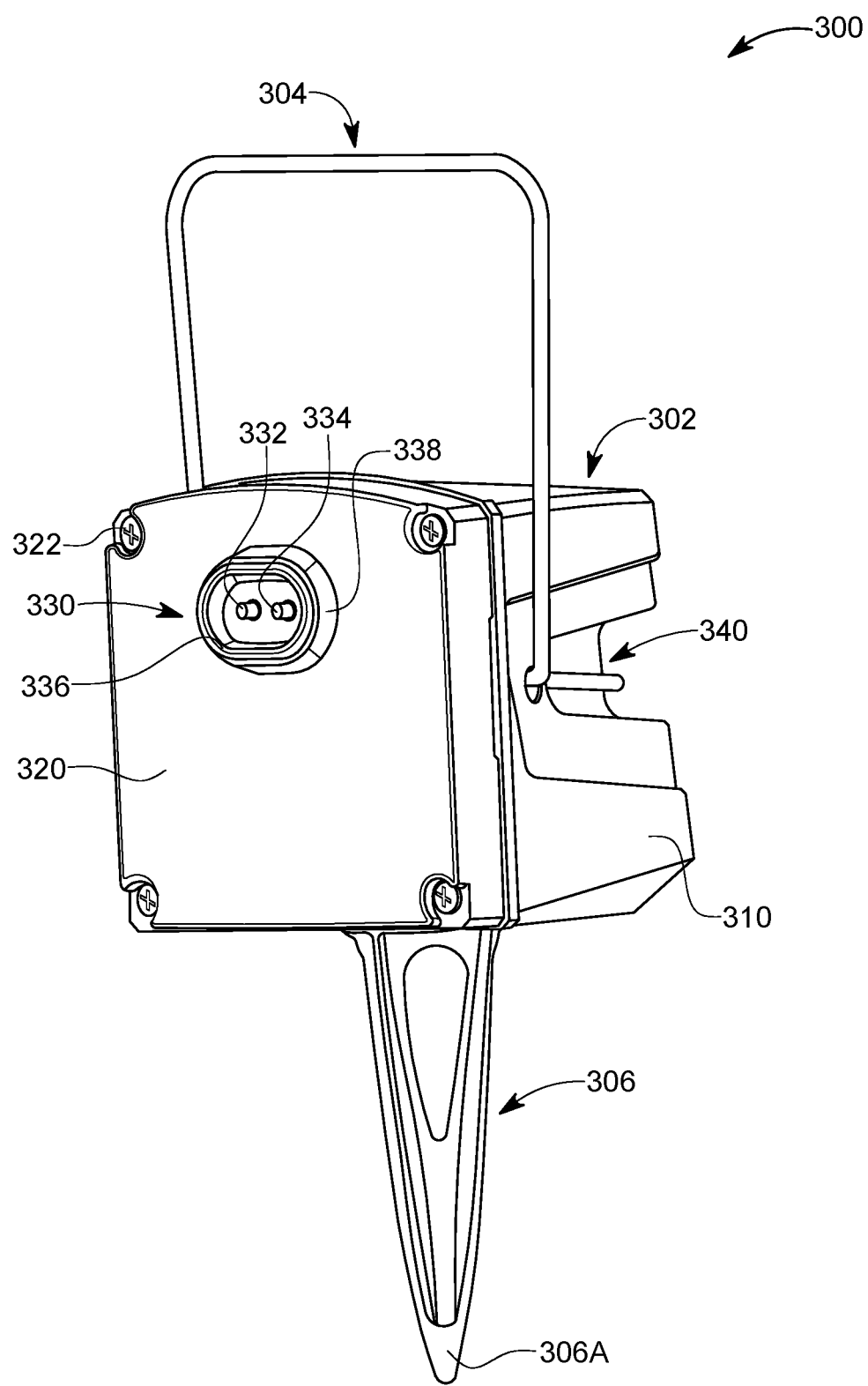
FIG. 3 is a schematic illustration of a digital node that has the same base as an analog base.

A DFU node is now discussed with regard to the figures. FIG. 3 shows a DFU node 300 that has a housing 302, a handle 304 (for example, a piece of rope) attached to the housing 302, and a spike 306 removably attached to the housing 302. The handle 304 is optional and is configured to provide the operator of the node with a means for carrying the node. The spike 306 is configured to have a sharp tip 306A for penetrating the ground, for achieving a good contact between the ground and the seismic sensor (for example, MEMS sensor) located inside the housing.

The housing 302 is made of two components, a base 310 and a cover 320. The cover 320 is attached to the base 310 so that the housing 302 forms a sealed, inside chamber 312 (to be discussed later). Note that the chamber 312 is formed inside the base 310 and has an open side 312'. The cover 320, when attached to the base 310, closes the open side 312' and seals the chamber 312. The cover 320 can be attached in various ways to the base 310. The embodiment shown in FIG. 3 shows the cover being attached with screws 322 to the base 310. Any type of screws may be used. In this embodiment, four screws are used. However, those skilled in the art would understand that more or less screws may be used. Note that the handle 304 is attached to the base 310 and not to the cover 320 as the same base is used for other types of sensors, as discussed later. Also, the spike 306 is removably attached to the base as the spike is not necessary for the AFU node.

The cover 320 has in this embodiment only one element, an external connection plug 330. The external connection plug 330 has first and second pins 332 and 334 for electrical connection to a docking module. The first and second pins 332 and 334 are surrounded by a protective skirt 336, which is configured not only to absorb shocks, but also to prevent water entering the chamber 312. The protective skirt 336 may be made of rubber or similar material. In addition, the cover 320 has a rigid belt 338 formed around the protective skirt 336 to prevent any accidental impact to the pins 332 and 334.

The base 302 is shaped as a box with a trench type depression 340 formed around three sides of the box. The depression 340 is shaped to conform to the human hand so that the operator of the node can easily handle the node. This feature suggests a size of the base 310 (less than 20 cm) for fitting the hand of the operator. In this way, the node is easy to handle during the recharging process.

Figure 4A:
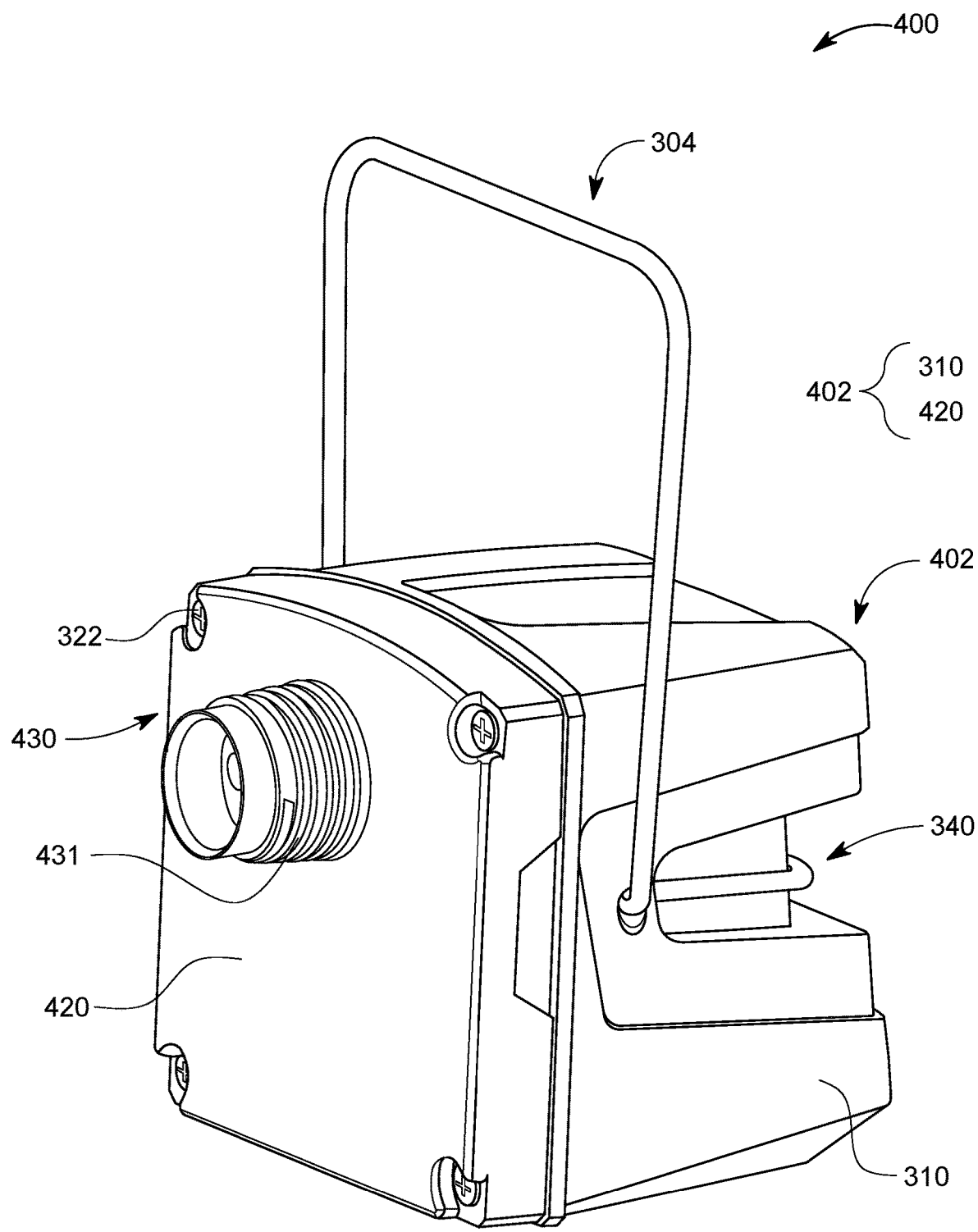
FIGS. 4A and 4B are schematic illustrations of an analog node that has the same base as a digital node.
Figure 4B:
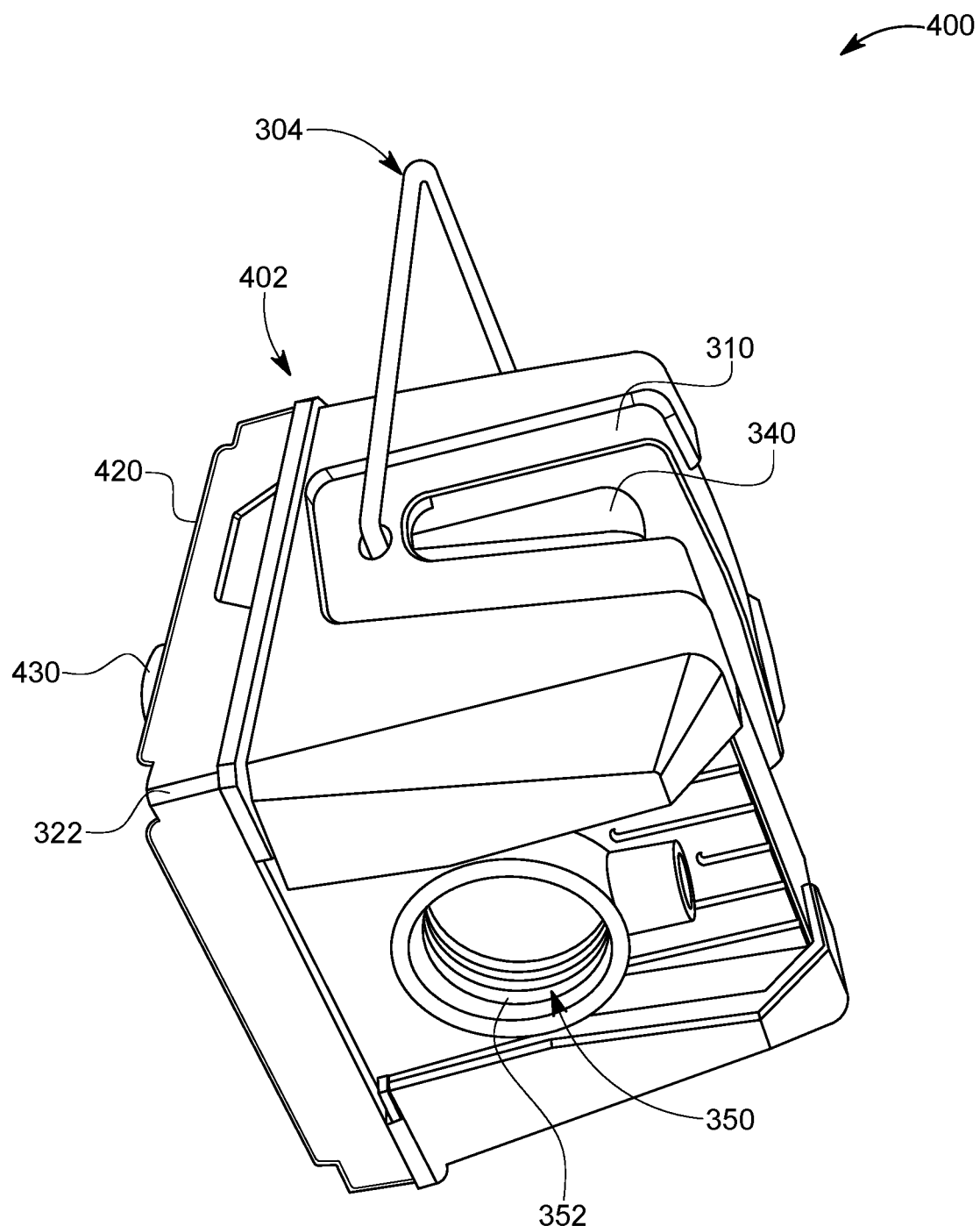

FIG. 4A shows an AFU node 400 that shares the same base 310 as the DFU node 302. Thus, the AFU node 400 has a housing 402 that includes the base 310 and another cover 420. The handle 304 is the same handle as for the DFU node 300. The base 310 has the same depression 340 for easy handling by the operator. The cover 420 is attached with the same screws 322 to the base as for the DFU node 300. However, the external connection plug 430 for the AFU node is different, for example, has external threads 431, than the external connection plug 330 of the DFU node for reasons to be discussed later. FIG. 4B shows that the housing 402 has a receiving unit 350 formed into the base 310, and this receiving unit is configured to receive the spike 306. The receiving unit 350 may have threads 352 that match corresponding threads on the spike 306, so that the spike 306 can be attached/removed as needed to the base. For the ADU unit 400, no spike is need and thus, FIGS. 4A and 4B illustrate the housing 402 without the spike 306. Thus, the spike 306 may be added or removed from the base 310 on a need basis.

Figure 5:
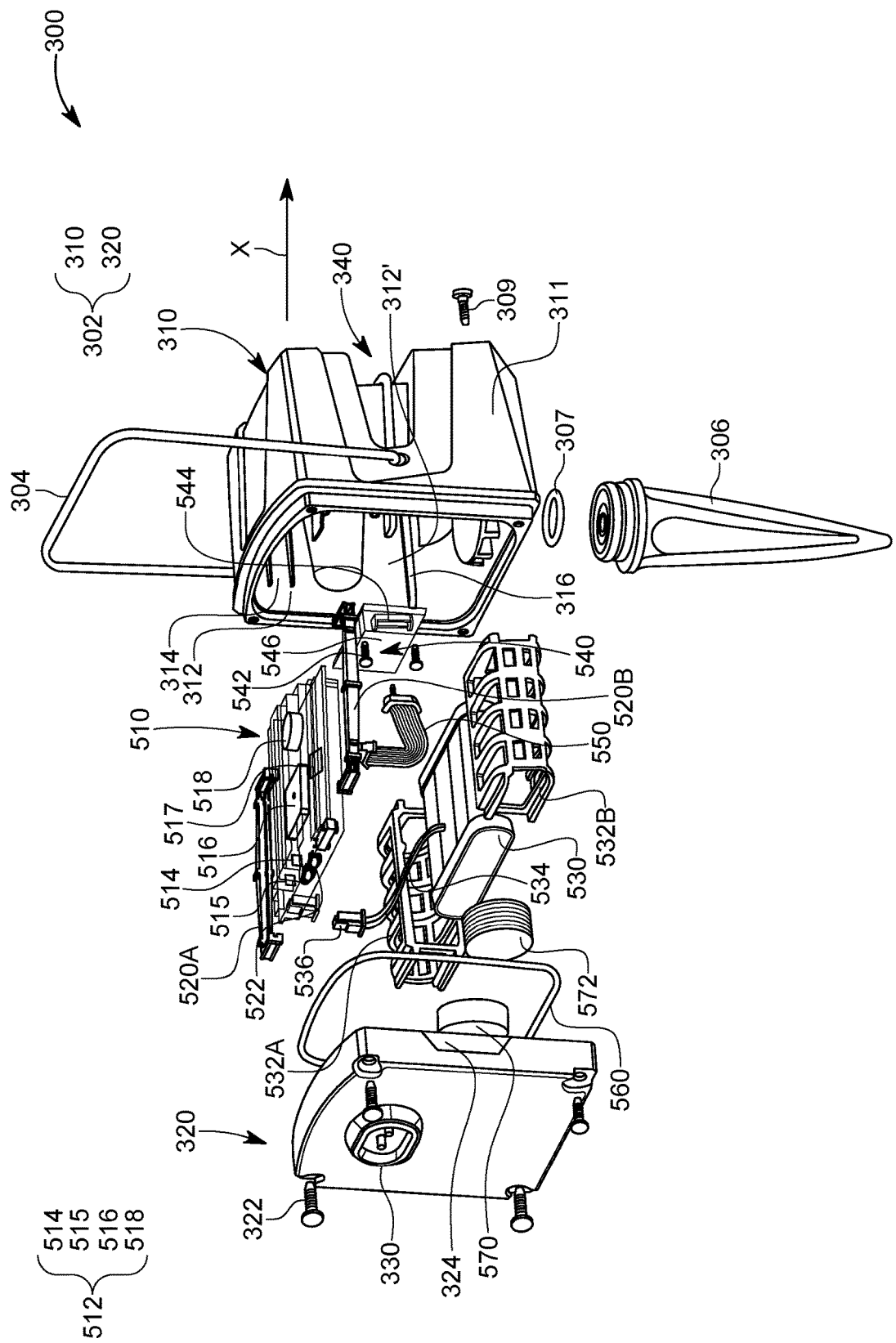
FIG. 5 is a schematic illustration of the various internal components of the digital node.

FIG. 5 shows an exploded view of the inside of the housing 302 of a node 300 and also of the various electronic and non-electronic components that are stored by the housing. Regarding the inside of the base 310, it is noted that it forms a chamber 312, which is open at only one face, which is configured to be fully covered by the cover 320, when attached to the base 310. Inside the chamber 312, there are first guides 314 that extend linearly along a first direction X, as shown in the figure. The first guides 314 may be made of the same material as the base 310, or of a different material. In one embodiment, both the first guides 314 and the base 310 are made of plastic or composite material. However, in another embodiment, they are made of metal.

The chamber 312 may also include second guides 316, that might extend parallel to the first guides 314. Both the first and second guides extend along opposite sides (or faces) of the base 310 and they are configured to guide various elements. For example, the first guides 314 are configured to guide a main electronic board 510 into the chamber 312 while the second guides 316 are configured to guide a battery pack 530 into the chamber 312. The main electronic board 510 includes a printed circuit board on which one or more electrical components 512 are added. The electrical components 512 may be an integrated circuit 514, which acts as a controller, a memory device 515 that is configured to store the collected seismic data, an antenna 516, a transceiver 517, and a GPS module 518. Other electronic devices may be included as necessary. The antenna 516 is connected to the transceiver 517, which is configured to establish wireless communication with a harvester, while the GPS module 518 receives GPU signals that may include a time stamp and location information. In one application, the node 300 includes a single transceiver and a single antenna for communicating with other nodes and also with a harvester device. The processor 514 may coordinate one or more of the functions of the node 300 as will be discussed later.

The entire main electronic board 510 may be attached to dedicated shock absorbers or damper elements 520A and 520B and this assembly is inserted together along the first guides 314 into the chamber 312. In other words, the damper elements sandwich the main electronic board and only the damper elements contact the first guides. Thus, the damper elements 520A and 520B directly contact the first guides while the main electronic board does not. The damper elements are made of a damping material, i.e., a material that is capable to absorb kinetic energy caused by shocks and transforms it into other forms of energy, for example, heat. An example of such a material is rubber or a soft plastic or a composite. The damper elements may be implemented as a beam that is fixed at both ends, but the rest of the beam is allowed to oscillated to damp the shocks. The purpose of the damper elements is to absorb any kinetic energy that may be transmitted otherwise to the main electronic board, for example, if the node is falling on the ground, or from internal vibrations induced by the transport of the node, so that the electronics on the main electronic board is not damaged. In this way, there is no hard point contact between the main electronic board and the base and the molding of the house. The dampers elements have a second purpose, which is related to the alignment of the main electronic board to the external connection plug 330, which is discussed later.

Figure 6:
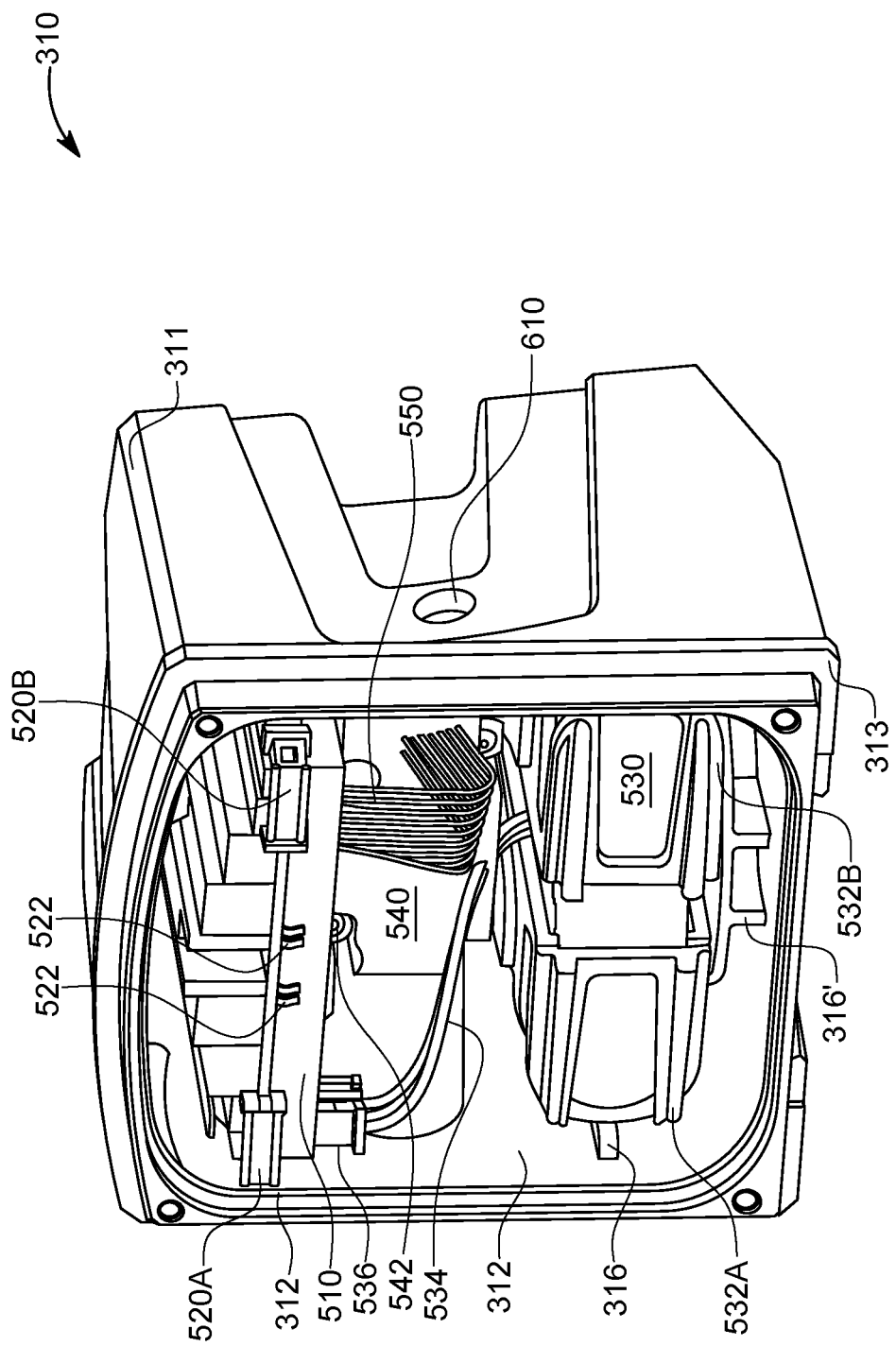
FIG. 6 is a schematic illustration of the internal components of the digital node that are housed by the common base.

FIG. 6 shows the base 310 hosting the main electronic board 510 and the battery pack 530, both of which are attached to their guides, inside the chamber 312. A sensor device 540 is also shown being directly attached to a wall of the base 312. Note that the battery pack 530 is much smaller than the previous batteries that have been used for seismic nodes. For example, a typical battery previously used for seismic nodes included 10 cells while the battery pack 530 may include only 4 cells. This is so because the main electronic board 510 has been optimized to include less electronic components and/or low consumption processing elements. Also, the processor 514 is a low-power microcontroller and the power efficiency of all the electronic components is improved. In addition, the use of only one transceiver to perform (1) multi-hop routing with the other nodes, and (2) local data exchange with a harvesting device (i.e., long- and mid-range operations) also require less energy. All these factors combined permit the DFU node 300 or the AFU node 400 to use a smaller battery than the existing seismic nodes.

FIG. 6 further shows that the main electronic board 510 has two or more connecting strips 522 located on a side, so that they will automatically engage with corresponding electrical connectors of the external connection plug 330 or 430 when the cover 320 or 420 is attached to the base 310. The connecting strips 522 provide electrical continuity with the flats of the contacts of the cover by absorbing any misalignment between the relative positioning of the contact surfaces in any of the six degrees of freedom. These misalignments may come from several sources: relative position of the cover relative to the case, or mobility of the board regarding the housing or the cover required for the damping of electronic components. Whatever these misalignments, the support force (or support "rest") of the connecting strips guarantees the transmission of charging (power) and data exchange currents. The shape of the strips makes it possible to distribute the deformations so as to preserve its stiffness and the slot of the stripes maximizes the contact surface with the flats of the contacts. On the opposite side to the stripes, the cover has a flexible support (or flexible "rest") to ensure the position of the board, thus ensuring the electrical contact. In one application, the strips 522 are flexible in order to remove the play when the pins of the cover are in contact with the strips, and reduce the problems of misalignment when engaged (the cover is fixed to the base).

FIG. 6 also shows that the second guide 316 may include an additional guide 316', which is configured to support the weight of the battery pack 530. This additional guide 316' provides a rigid bottom tray that is configured to withstand a crash of the node with the ground, and also to ensure a good coupling. Its rigidity may be used to eliminate vibratory modes. The additional guide 316' may be configured together with the second guide 316 to ensure that the battery pack 530 clamps or snaps into place, with no need for additional fastening devices. Also visible in FIG. 6, there is a hole 610 formed in a side of the base 310. This hole may serve for attaching the rope or wire 304 so that the entire node 300 can be easily transported when deployed in the field.

Returning to FIG. 5, the battery pack 530 has its own dampers 532A and 532B, which are attached to the battery pack, and these dampers engage the second guides 316, as shown in FIG. 6, for fixing the battery pack to the interior of the base 310. The dampers 532A and 532B not only protect the battery 530 against various unwanted shocks (e.g., the fall of the node on the ground) and internal vibrations induced during transportation, but also allow for an expansion of the size of the battery pack due to the charging/discharging process and/or temperature. Both FIGS. 5 and 6 shows an electrical connection 534 that electrically connects the battery pack 530 to the main electronic board 510, for supplying power. In the embodiment illustrated in FIGS. 5 and 6, the electrical connection 534 is fixedly attached to the battery pack 530 and removably connected with a connecting head 536 to the main electronic board 510. Note that by placing the battery pack 530 to the bottom of the base 310, due to the location of the second guide 316 under the first guide 314, the center of gravity of the entire node is lowered, which is desirable as this makes the node more stable and less prone to fall toward the ground when the spike 306 is not fully embedded into the ground.

FIG. 5 further shows the sensor device 540 that is configured to be attached with screws 542 to the base 310. This is so because the sensor 544, which is attached to a board 546 of the sensor device 540, needs to detect a particle motion related parameter, and this particle motion is better detected when there is a good coupling between the sensor and the base 310. Note that in this embodiment, the board 546 includes an analog-to-digital converter for transforming the analog signals recorded by the sensor 544 into digital signals. Thus, the signals that are sent by the sensor device 540 to the main electronic board 510 are digital signals. For this reason, the sensor device 540 is also called herein a digital sensor device. The particles of the ground in which the spike 306 is placed vibrate due to the generated seismic waves. These vibrations of the particles propagate through the spike and the base 310 to the sensor device 540. In order to accurately record these particle vibrations, a good coupling between the sensor 544 and the base 310 is necessary. The sensor 544 is configured to detect at least one of a displacement, speed or acceleration of the ground particles. In one embodiment, the sensor 544 is a microelectromechanical system (MEMS) that is configured to determine an acceleration along a single axis, or three-mutually perpendicular axes. Any other kind of sensor may be used for determining a parameter related to the vibration of the particles. The sensor device 540 is electrically connected to the main electronic board 510 with a removable electrical connection 550. The electrical connection 550 is fixedly attached in this embodiment to the main electronic board and removably attached to the sensor device. However, the reverse is also possible or both ends may be removable. Thus, when this assembly is modified as discussed later to make it an AFU node, the sensor device 540 is removed and the electrical connection 550 is not attached to a sensor or may be removed all together. In one embodiment, if the electrical connection 550 is made to be removably attached to the main electronic board, then the electrical connection can also be removed for the AFU node.

FIG. 5 also shows a seal 560 that is placed between the cover 320 and the base 310 for sealing the chamber 312 to prevent water or particles from outside the node to enter the chamber 312. In this regard, note that these nodes are sometimes placed in wet or sandy locations, and thus all these potentially damaging factors need to be kept away from the electronics of the node. In addition, FIG. 5 shows that the node 300 may optionally include a desiccant material 570, which is attached to the cover 320, and a RFID tag 572, also attached to the cover 320. The desiccant material 570 is used to absorb the possible formed humidity from inside the chamber 312 while the RFID tag 572 provides a unique ID for the node so that it is easy to identify which node was placed where. Note that during a land seismic survey it is possible to have hundreds if not thousands of nodes placed over the area of interest and keeping track of all these nodes is a considerable job. By having each node tagged with an RFID that has a unique ID makes the job of identifying the nodes easier.

FIG. 5 further shows that the spike 306 may be used with a seal 307 to be attached to the exterior of the base 310. To prevent the spike 306 from detaching from the base 310, it is possible to fix the spike 306 with a screw 309 to the receiving unit 350 (see FIG. 3). In addition, FIGS. 5 and 6 show that a soft molding protection cover 311 may be placed over parts of the base 310 to further prevent any unwanted kinetic energy that might be transmitted to the node due to falls, to protect the electronic components from shocks. In one embodiment, the ends 313 of the soft molding protection cover 311 may be over-molded, as shown in FIG. 6, to further enhance this protection.

Figure 7:
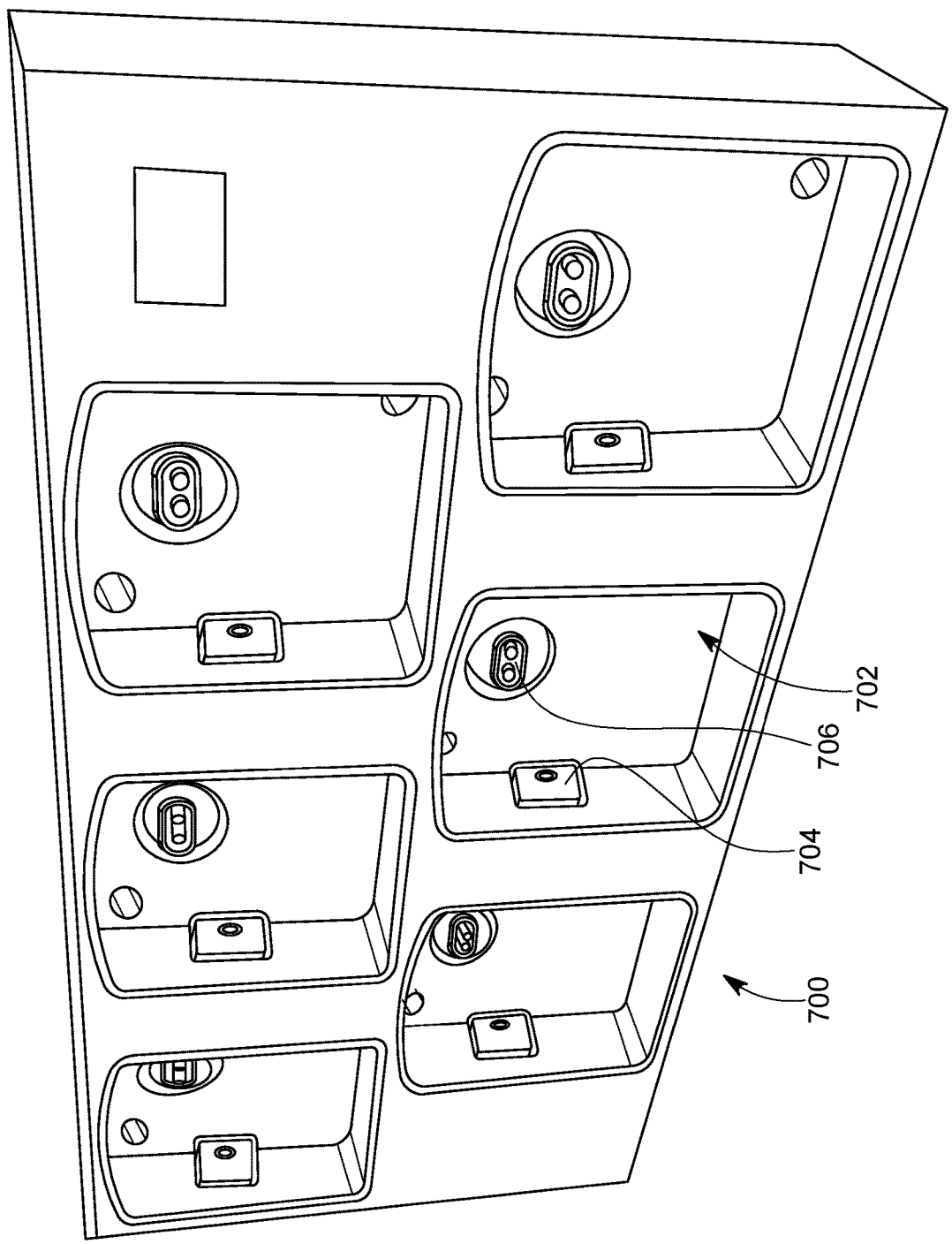
FIG. 7 is a schematic illustration of a docking module that is configured to recharge plural seismic nodes.

FIG. 5 further shows that the cover 320 may have indentations or slots 324 formed on opposite sides so that the node can be attached to a docking bay 702 from a docking module 700, which is shown in FIG. 7, and held in place for recharging the battery and transferring the recorded seismic data. FIG. 7 shows a corresponding clamp or tab 704 in the docking bay 702 that is configured to engage the slots 324 in the node 300 for mechanically engaging the node and holding it in place during the recharging process. FIG. 7 further shows a base connection plug 706 that is configured to electrically connect to the external connection plug 330 of the node and through this interface, power is transferred from the docking station 700 to the battery 530 of the node, and the stored seismic data is transferred from the memory 515 of the node to a server associated with the docking station 700.

Figure 8:
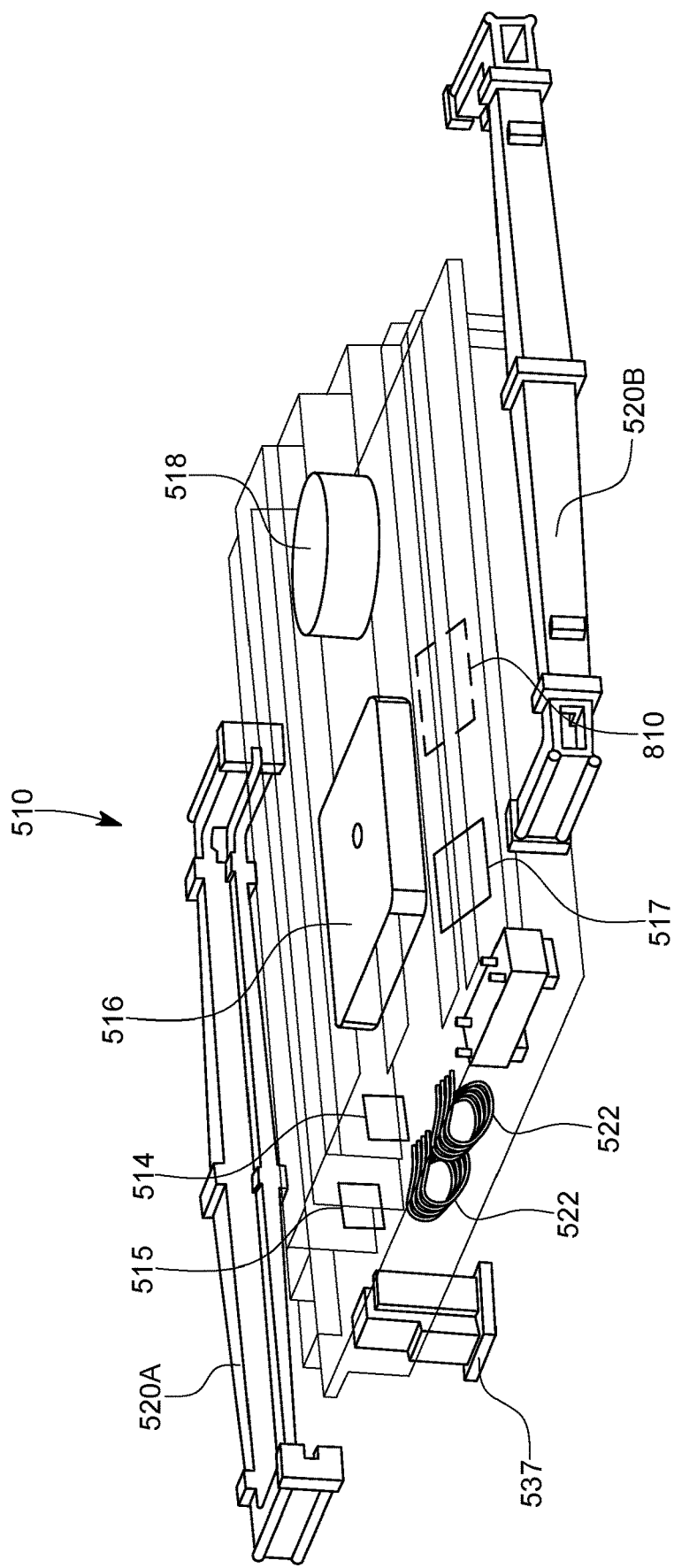
FIG. 8 is a schematic illustration of a main electronic board that is placed inside the common base for both the digital and analog nodes.

Various possible detail implementations (some of them are even optional) of the above features are now discussed. In this respect, FIG. 8 shows the main electronic board 510, the processor 514, memory 515, antenna 516, transceiver 517, and GPS module 518. Note that all these elements are placed directly on the main electronic board 510 in this embodiment. However, it is possible to place one or more of these elements on a secondary electronic board. FIG. 8 further shows the damper elements 520A and 520B that sandwich the main electronic card 510 when mounted inside the base 310. In one application, one of the damper elements is configured to block a memory card 810, which is removably attached to the main electronic board 510, from exiting its place when the node is bumped. In this regard, note that it is not unusual for the personnel handling the nodes to drop them to the ground or hit them to a hard surface, which is enough to dislodge the memory card from its location unless blocked by the damper element. The memory card 810 can correspond to the memory 515 shown in FIG. 5 and may be configured to store the collected seismic data. FIG. 8 further shows an electrical head 537 that is configured to receive the connecting head 536 of the electrical connection 534 from the battery 530. Note that the electrical connection 534 is a flexible connection, i.e., it can be bent.

Figure 9:
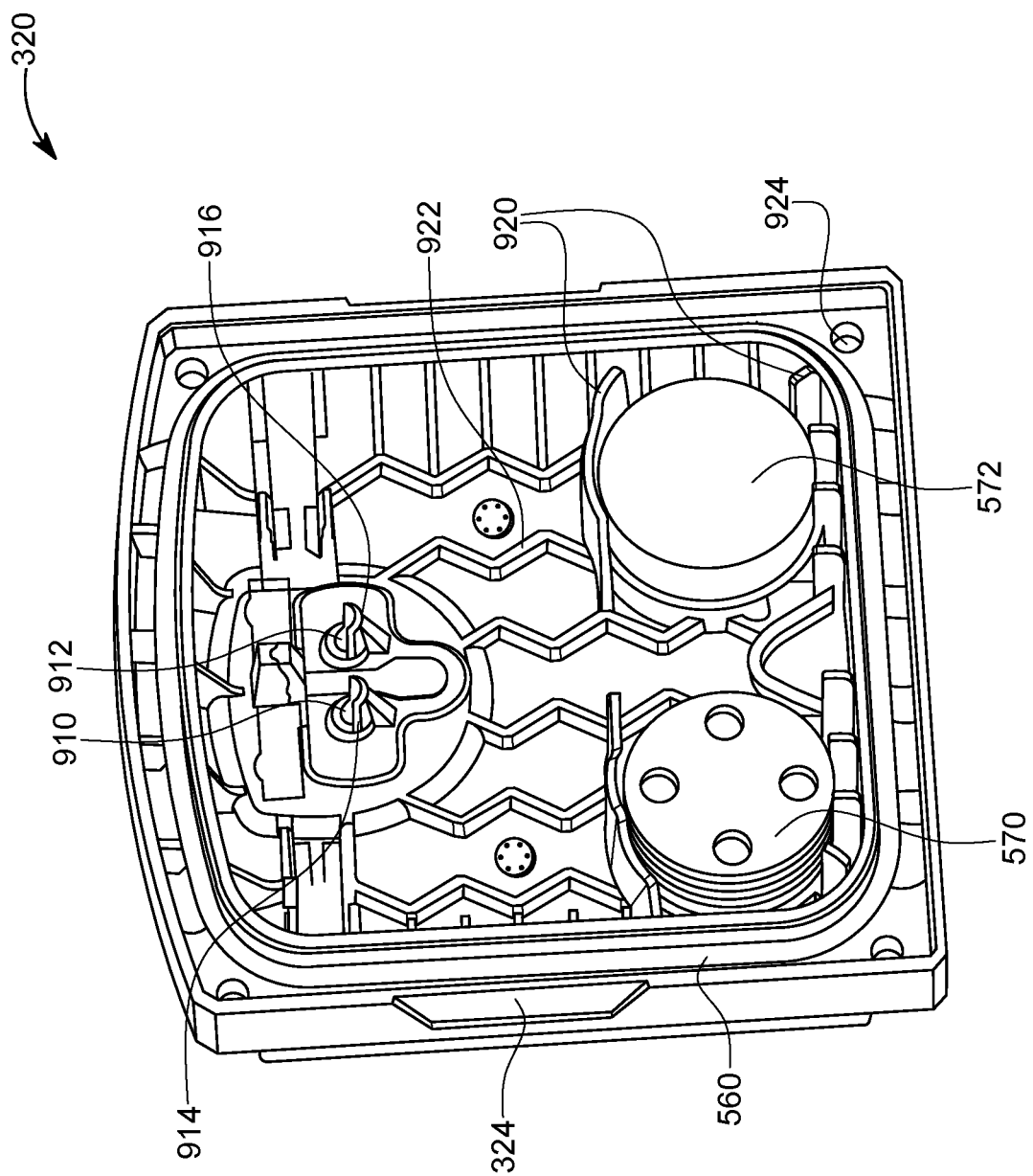
FIG. 9 is a schematic illustration of a back face of a cover that is added to the common base for the digital sensor.

FIG. 8 further shows the two connecting strips 522 that are connected to the main electronic board 510 and serve to electrically connect to two pins of the external connection plug 330. In this regard, FIG. 9 shows the back face of the cover 320, having first and second internal pins 910 and 912 that extend through the entire thickness of the cover to connect to the first and second external pins 332 and 334 (see FIG. 3) on the front face of the cover. The first and second pins 910 and 920 electrically engage the first and second connecting strips 522 for electrical power and data transfer. The pins 332 and 334 (shown in FIGS. 3 and 5), which are electrically connected to the first and second pins 910 and 920, are configured to engage the connection plug 706 of the docking module 700 shown in FIG. 7. In this way, electrical power and data can be transferred along these elements between the main electronic card 510 of the node 300 and a server connected to the docking module 700.

Figure 10:
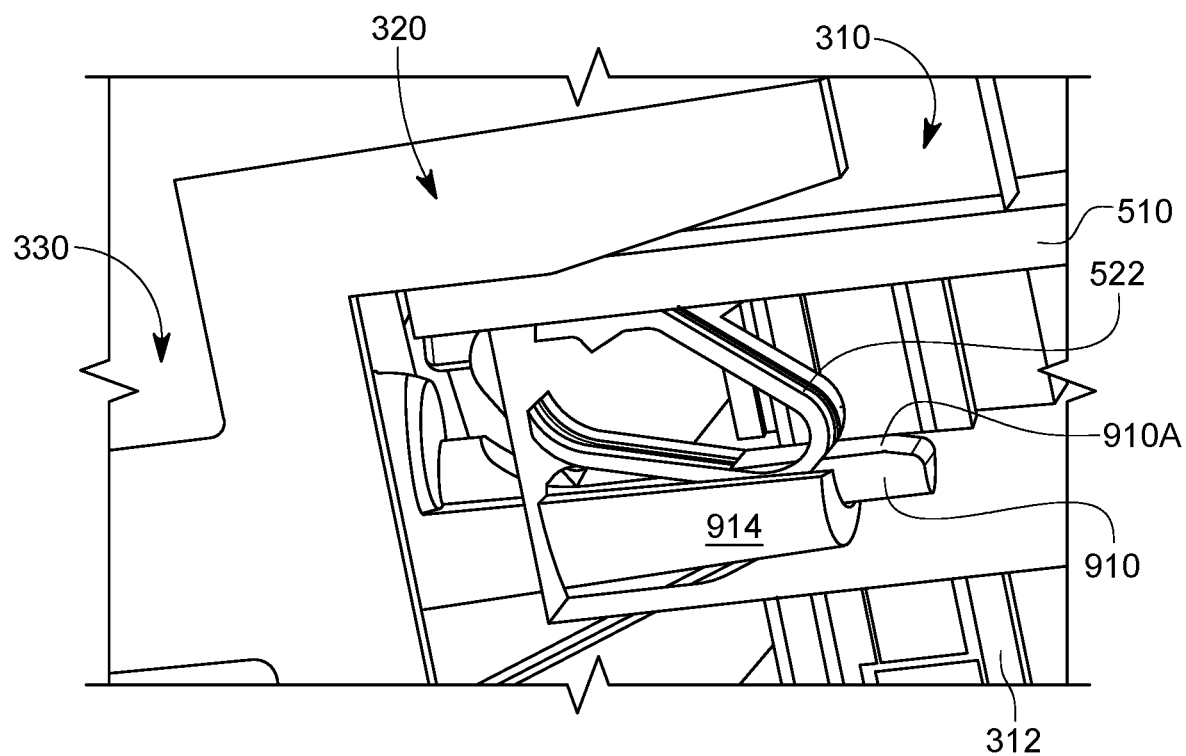
FIG. 10 is a schematic illustration of an electric connection between the cover and the main electronic card for the digital node.

The first and second pins 910 and 912 may be configured to have a half flat and a half round contour, so that flat faces 910A and 912A are present and are configured to directly engage the corresponding strips 522, as shown in FIG. 10. In one application, support elements 914 and 916 (see FIGS. 9 and 10) may be formed unitary with the cover 320 and these support elements are configured to directly support the first and second pins 910 and 912, respectively, as also shown in FIG. 10. FIG. 10 shows that when the cover 320 is fully engaged with the base 310, each connecting strip 522 directly presses on a corresponding pin 910 and 912, and the pins are sandwiched between the strips 522 and the support elements 914 and 916. As the support elements 914 and 916 are rigid and the first and second strips 522 are elastic, for example, made of a flexible metal, a very good electrical coupling is achieved between the strips 522 and the first and second pins 910 and 912. Also this coupling is achieved automatically as the strips 522 and the pins 910 and 912 are pre-located in the base and the cover, respectively, so that they contact each other by simply placing the cover 320 over the base 310.

Returning to FIG. 9, it also shows how the desiccant material 570 and the RFID tag 572 are attached to the back of the cover 320, at corresponding locations defined by dedicated slots 920. The back of the cover 320 may be manufactured to have a honeycomb structure 922 to offer more mechanical resistance. FIG. 9 also shows the seal 560 that is placed between the cover 320 and the base 310, and the indentations 324. Holes 924 formed in the cover 320 correspond to the screws 322 shown in FIG. 5.

Figure 11A:
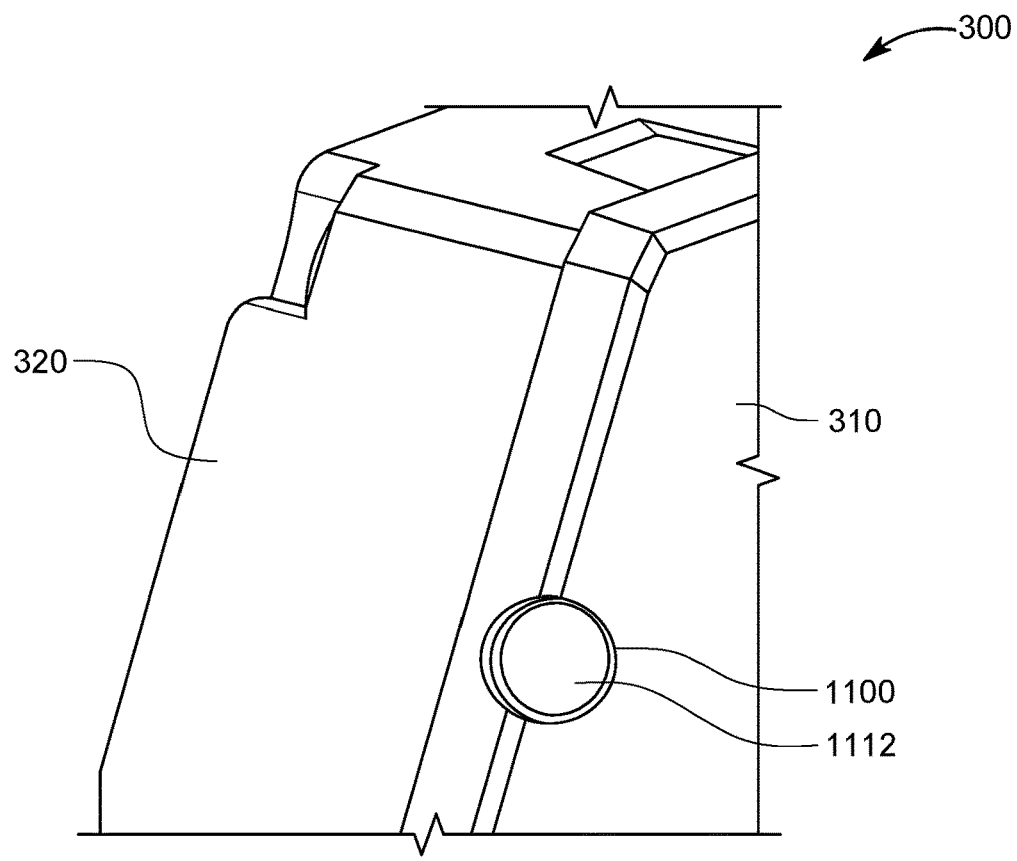
FIGS. 11A and 11B are schematic illustration of a status indicator that is attached to the common base.
Figure 11B:
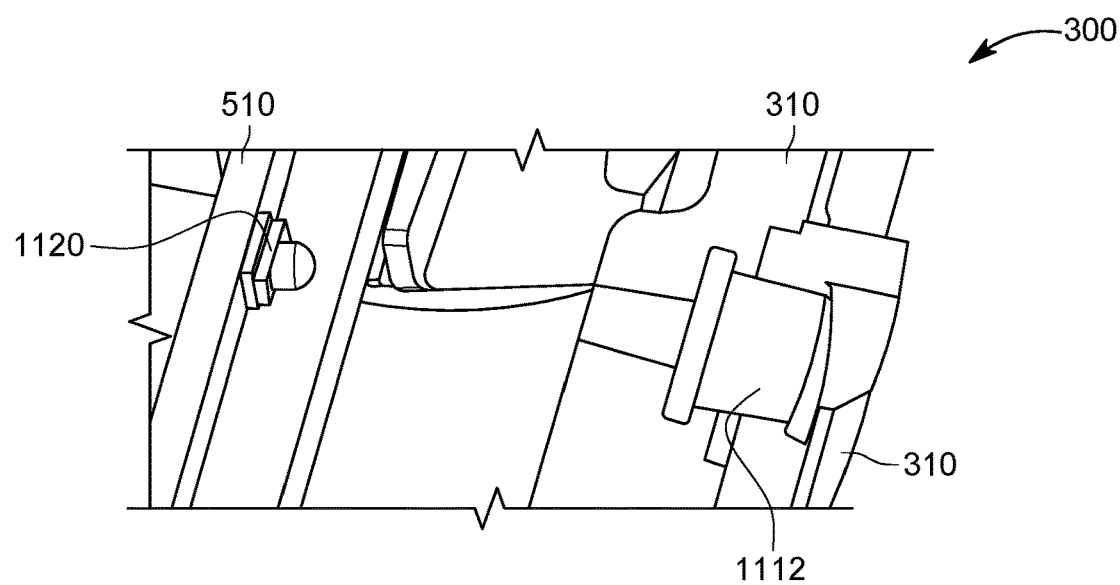

There are circumstances when it is desired to know a status of the node without removing the cover 320 from the base 310, for example, when the battery is depleted, when the memory card is full, when the processor is operational, when a component has failed, etc. For these instances, a light-emitting diode based indicator may be installed for indicating the status of the node. In one application, as illustrated in FIG. 11A, a hole 1110 is made into the protection cover 311 and a wall of the base 310 and a light transmitting element 1112 is placed into that hole. The light transmitting element 1112 may be a plastic material that allows the light to pass, but not water or other particulates. A light emitting diode 1120 is placed inside the chamber 312, for example, on the main electronic card 510. The light emitting diode 1120 is electrically connected to the processor 514. Depending on the status detected by the processor 514 about various elements of the node, the processor may instruct the light emitting diode 1120 to send one or more pulses, short or long or a combination of them, through the light transmitting element 1112 so that an operator of the node can see the status of the node without opening the cover. In one embodiment, the light transmitting element 1112 is formed to have a shape that engages with the wall of the base, so that no water can pass from outside the node into the chamber. For preventing the accumulation of condensation on the element, its outer surface may be sloped so that, if accumulation occurs, it slides to the edges of the element.

Figure 12:
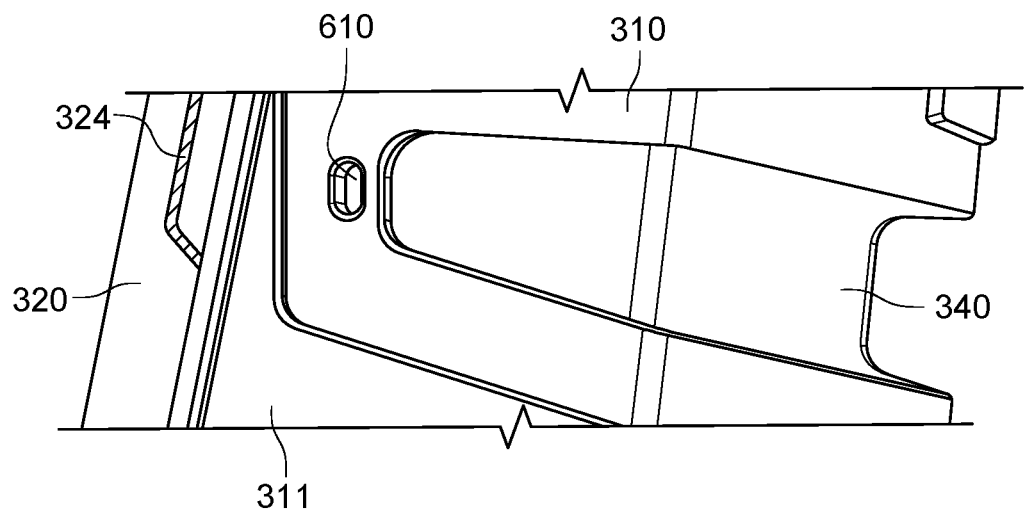
FIG. 12 is a schematic illustration of a back side of the common base that is shaped specifically to fit the hand of the operator.

The depression 340 and the hole 610, previously discussed, are shown in FIG. 12 as being formed in the wall of the base 310. Note that in one embodiment, the protection cover 311 does not extend over these elements. In one application, the hole 610 in fact communicates with the depression 340. The depression 340 may be made to have a U-shaped grip area, which is especially helpful for the operator when placing the node 300 into a docking bay as illustrated in FIG. 7.

Figure 13:
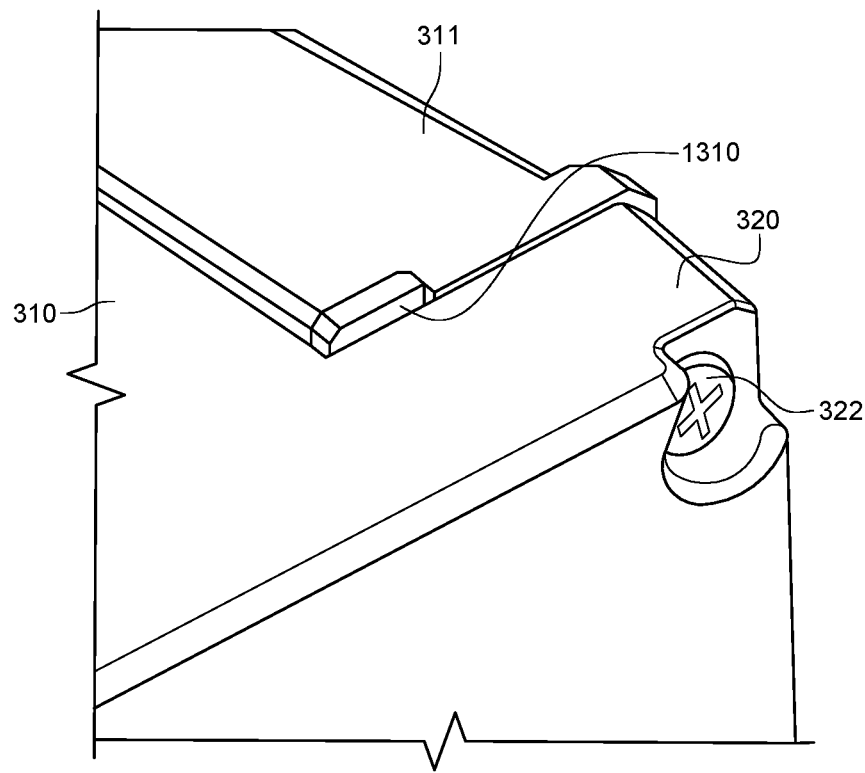
FIG. 13 is a schematic illustration of a slot formed between the common base and the cover for facilitating the opening of the node when desired.

In one embodiment, as illustrated in FIG. 13, there is a passage 1310 formed between the base 310 and the cover 320 so that a screwdriver can be inserted into this passage to pry open the cover from the base, after the screws 322 have been removed. This operation may need to be performed when changing the cover 320 for the DFU node 300 with the cover 420 for the AFU node 400. In one embodiment, the screws 322 are self-tapping screw without inserts. Other types of screws may be used.

Figure 14A:
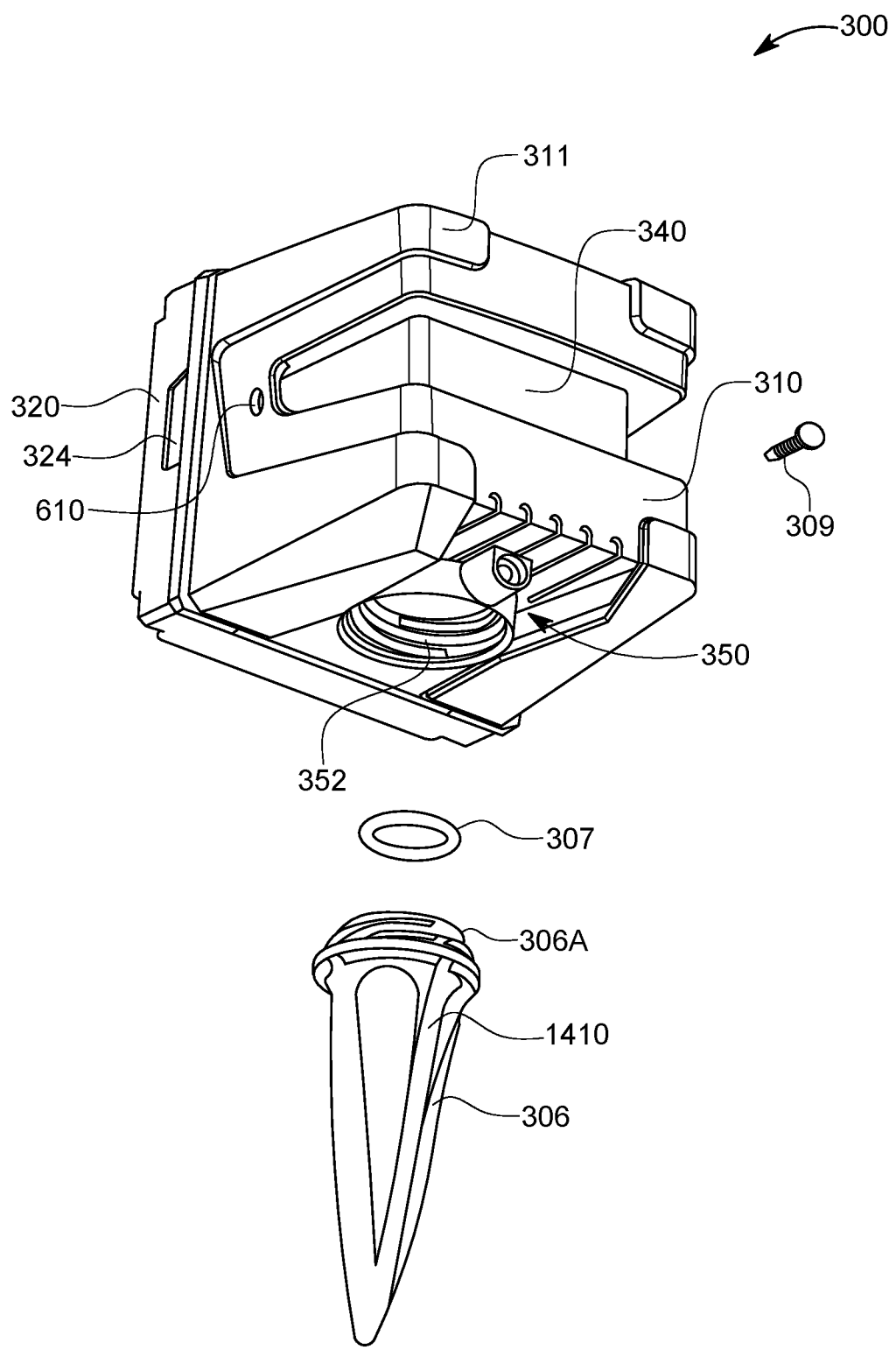
FIGS. 14A and 14B are schematic illustrations of a spike that is added to the common base for the digital node.
Figure 14B:
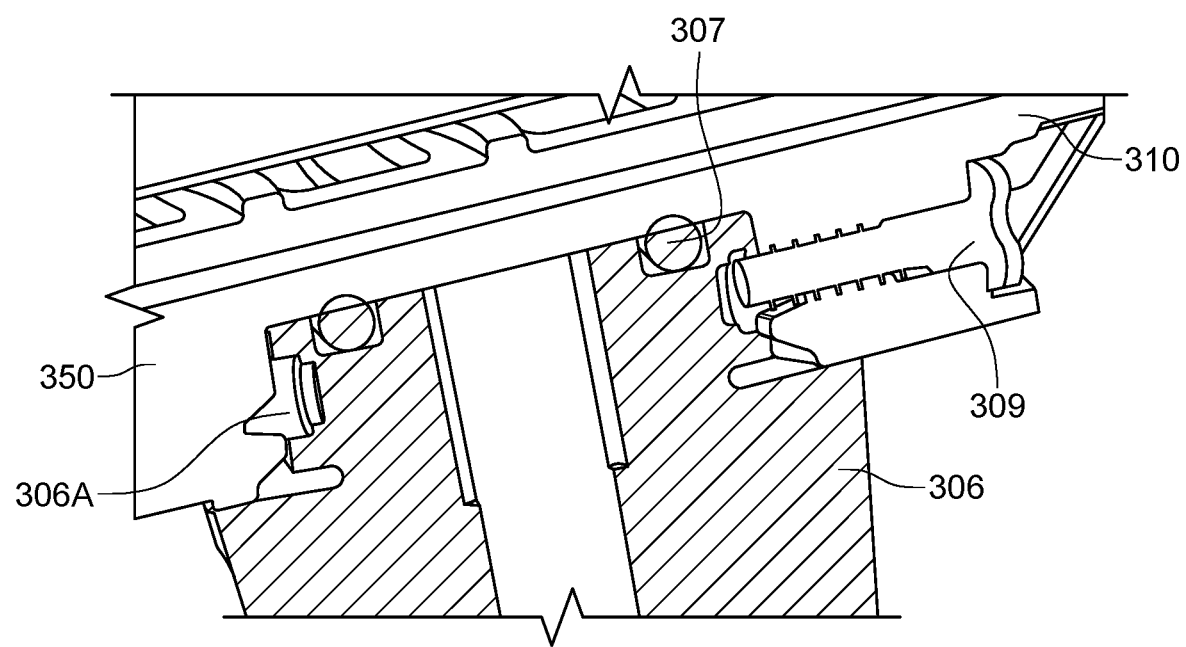

FIG. 14A shows in more detail the spike 306 and how it is attached to the corresponding receiving unit 350 formed in the base 310. As previously discussed, the spike 306 is attached to the DFU node 300 for planting the node into to ground. However, this spike is removed from the base 310 when the base is incorporated into the AFU node 400. In one application, the spike 306 is made of plastic, to absorb the shock if any is applied. A profile of the spike may be selected to optimize a ratio between the planting force and the coupling force. For example, as illustrated in FIG. 14A, one or more ridges 1410 may be formed along the spike 306. Seal 307, which may be a rubber seal, is configured to act as a shock absorber. The upper end 306A of the spike 306, which is configured to engage with the receiving unit 350, may have a double thread with a one-half or a one-quarter turn mounting. To prevent the spike 306 from coming detached from the base 310, a screw 309 may be added into the receiving unit 350 to contact the spike 306, to fix the spike relative to the receiving unit, as shown in FIG. 14B. Note that the seal 307 and the screw 309 are configured to allow slight axial movement of the spike relative to the base for further damping a movement to be transmitted to the base.

Figure 15:
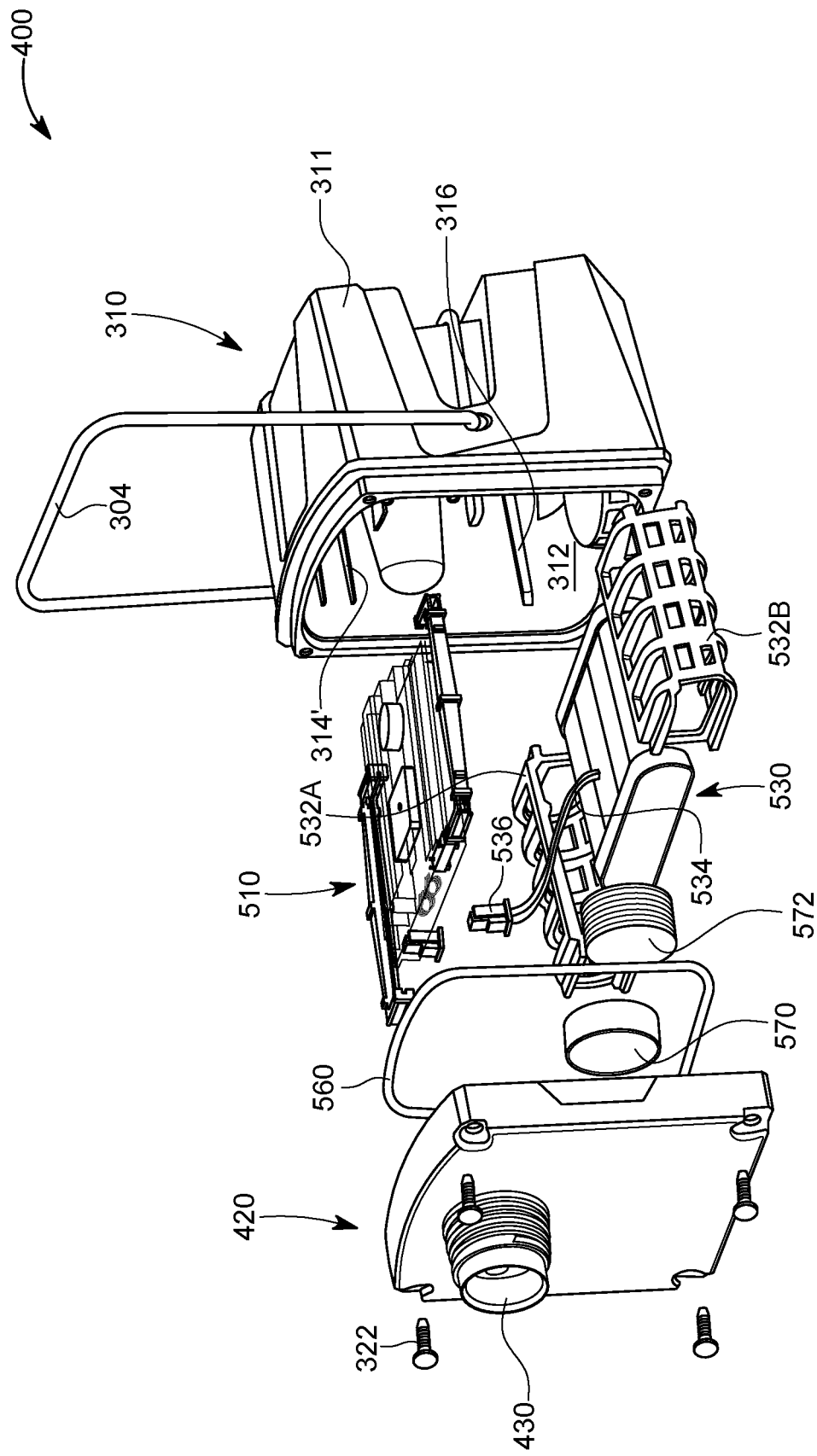
FIG. 15 is a schematic illustration of the various internal components of an analog node.

As previously discussed, the base 310 can be used not only for the DFU node 300, but also for the AFU node 400 shown in FIGS. 4A and 4B. In other words, the base 310 is interchangeable for these different nodes. This means that a manufacturing process and assembly of these nodes is simplified as a common base is used for both of them. For the AFU node 400, as illustrated in FIG. 15, the base 310 has exactly the same configuration as the base 310 for the DFU node 300. Even more, the electronics that is placed inside the base 310 is almost similar to that of the DFU node 300. More specifically, FIG. 15 shows that the same main electronic board 510 and battery pack 530 are inserted with their dampers into the guides formed in the base 310. For the AFU node 400, the internal sensor device 540 is not present, as a different, external sensor is attached to the node. Thus, the sensor device 540 and its electrical connection 550 are omitted in the AFU node 400. In one embodiment, every electronic part shown in FIG. 5, except the cover 320, the sensor device 540, and the electrical connection 550, is present in the embodiment illustrated in FIG. 15. Thus, all those common components are not discussed herein again. Further, the use of so many common components simplify the manufacturing and assembly process easier as less components need to be manufactured, stored and assembled for each node.

Figure 16:
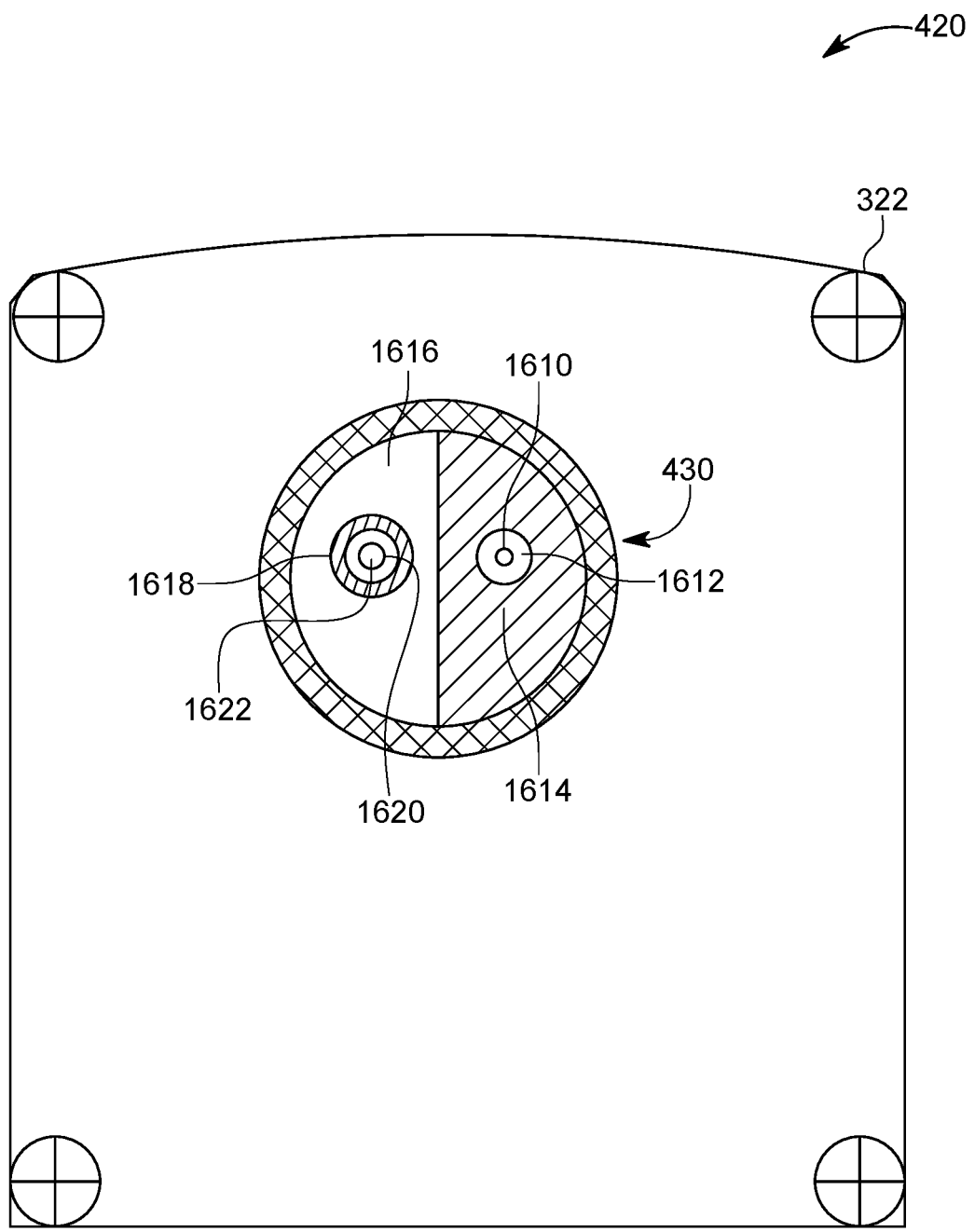
FIG. 16 is a schematic illustration of a cover that is added to the common base for the analog node.

The cover 420 of the AFU is different from the cover 320 of the DFU unit 300 in terms of its external connection plug 330. The cover 420 has a different external connection plug 430 than the cover 320 for the DFU node, and the cover 420 is configured to be attached to one or more external sensors (not shown), for example, geophones, through the external connection plug 430. The external connection plug 430 is shown in more detail in FIG. 16 and includes a pin 1610 that is placed in a hole 1612 formed in a half-body 1614 of the connection plug 430. The half-body 1614 of the connection plug occupies only half of the connection plug. The other half is a depression 1616 from which a tubular part 1618 raises to the same level as the half-body 1614. A hole 1620 with a tubular metal contact 1622 is formed inside the tubular part 1618 for receiving a pin from the external sensor (not shown).

Figure 17A:
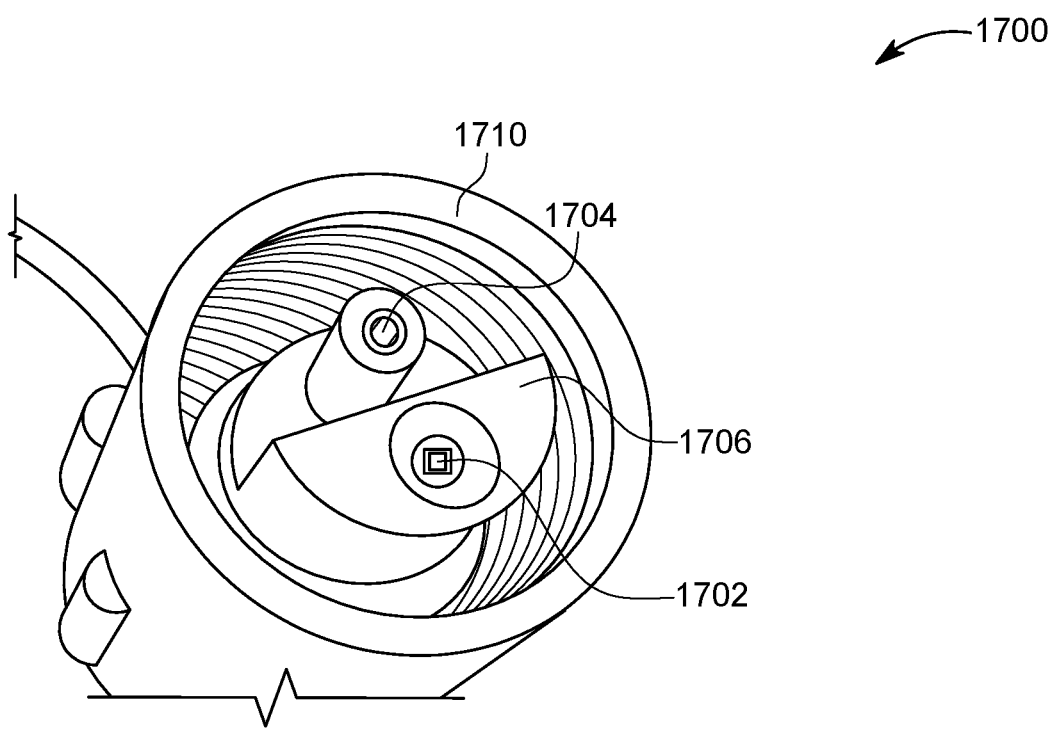
FIGS. 17A and 17B are schematic illustrations of a connection between an external sensor and the analog node.
Figure 17B:
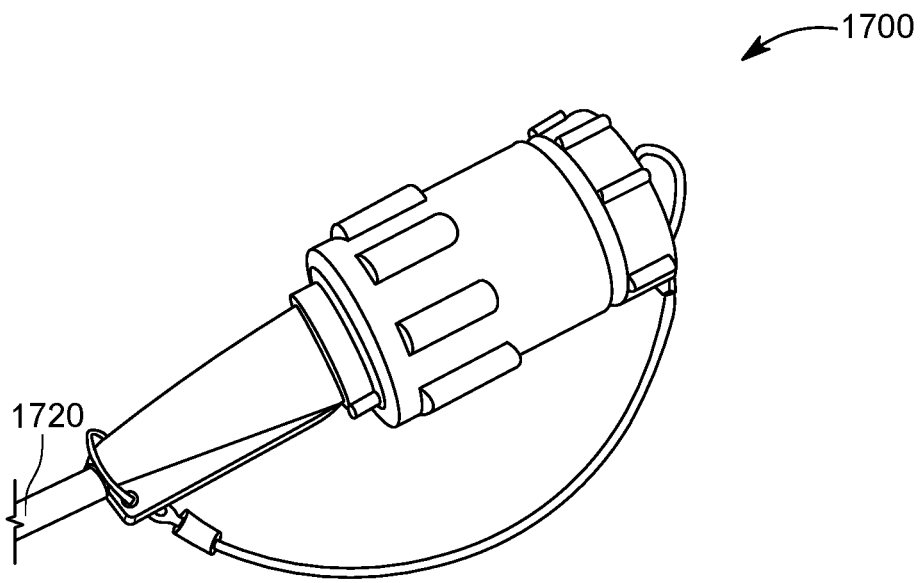

A connecting mechanism 1700 that mates with the connection plug 430 is shown in FIGS. 17A and 17B. FIG. 17A shows the connecting mechanism 1700 having a metallic pin 1702 and a metallic tubular member 1704 that are configured to mate with the tubular metal contact 1622 and the pin 1610, respectively. The body 1706 of the connecting mechanism 1700 is configured to have a raised half and a lower half, to mate with the corresponding lower and raised halves 1616 and 1614 of the connection plug 430. A sleeve 1710 is attached to the connecting mechanism and is configured to engage by threads, corresponding threads 431 (see FIG. 4A) formed on the exterior surface of the connecting plug 430. FIG. 17B shows the connecting mechanism 1700 also having a cable 1720 that transports information and/or electrical power from the pin/tubular members to the external sensors attached to the cable.

Figure 18:
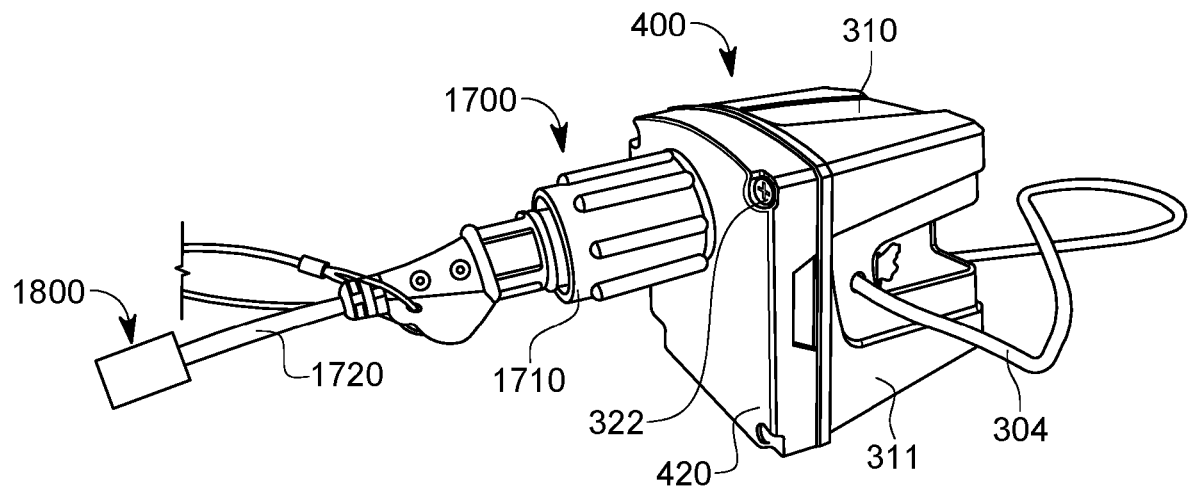
FIG. 18 is a schematic illustration of the analog node being attached to an external sensor through the cover.
Figure 19:
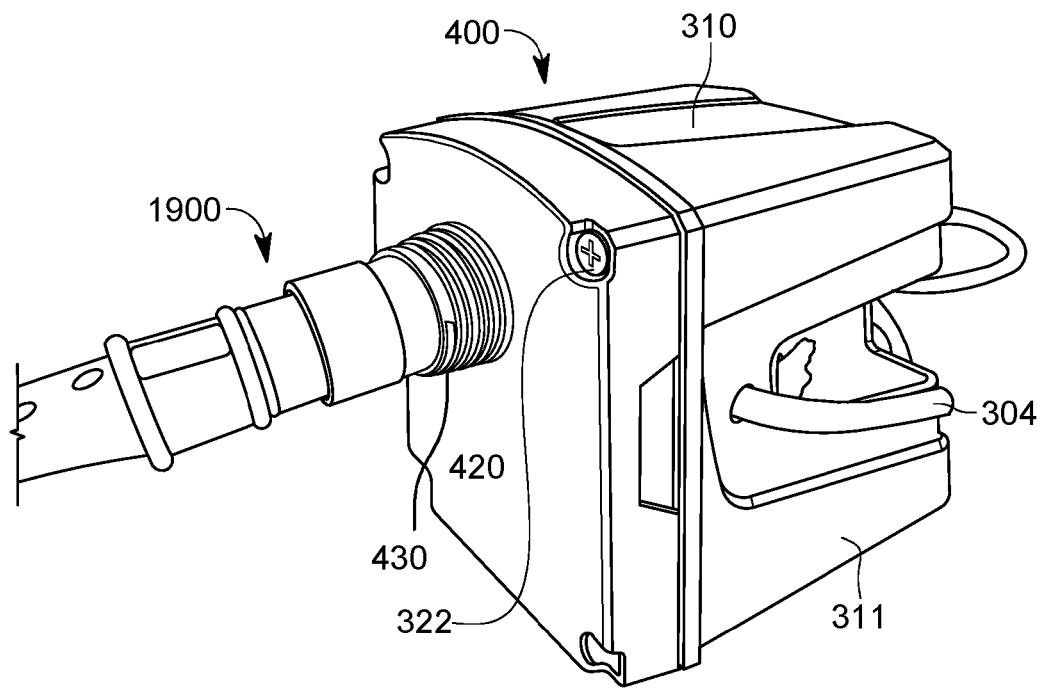
FIG. 19 is a schematic illustration of the analog node being attached to another external sensor.

In this regard, FIG. 18 shows the connecting mechanism 1700 and a sensor 1800 (e.g., a geophone), which is attached to the cable 1720 of the connecting mechanism 1700, as being connected to the cover 420. Note that the connection plug 430 is not visible in FIG. 18 as it is covered with the sleeve 1710 of the connecting mechanism 1700. While FIG. 18 shows only a single sensor 1800 attached to the cable 1720, it is possible to have plural sensors attached to this cable. In yet another embodiment, it is possible to attach the external sensor(s) 1800 to the connection plug 430 through a connecting mechanism 1900, which is similar to the connecting mechanism 1700, but does not have the sleeve 1710, as shown in FIG. 19. The external sensor 1800 records analog data, which is transmitted as such to the main electronic board 510. For this reason, the seismic node 400 is also called an analog field unit. Those skilled in the art would understand that while FIGS. 17A and 17B describe a KCK2 type connector, other connectors may be used as long as the connecting mechanism and the connecting plug are configured to match each other. The choice of the KCK2 type connector in these figures is justified because the legacy sensors 1800 in the industry have already this type of connection, and thus, it is desired that the novel node 400 is backward compatible with the existing sensors. However, this historical reason would not prevent that other types of connections may be implemented with the AFU node 400.

From the descriptions of the DFU node 300 and the AFU node 400 above, it is noted that regardless of the sensor type that needs to be deployed for a land seismic survey, a common base 310 is used. If a digital sensor (like a MEMS sensor) needs to be deployed, then the sensor device is placed inside the base 310 and is electrically connected to the main electronic board. If an analog sensor (like a geophone) needs to be deployed, then no sensor is placed inside the base, but rather the sensor is attached externally to the cover that covers the base. The cover that covers the base is different for each type of sensor. For the digital sensor, the cover 320 has an external connecting plug 330 for exchanging power and/or information with a docking module, when the node is prepared, after or before the seismic survey. For the analog sensor, the cover 420 has an external connecting plug 430 that is used for connecting to the external seismic sensor 1800 during the seismic survey, or to the docking module before or after the seismic survey, for maintenance. In addition, the DFU node is configured to receive a spike 306 that is configured to be planted into the ground, for obtaining a better coupling of the base (which houses the seismic sensor) with the ground. The spike 306 is not present when the AFU node uses the base 310, as the seismic sensors 1800 are directly connected to the ground for recording the seismic data.

While the embodiments discussed with regard to the figures show that a lateral face 312' of the base 310 is opened to the ambient before the cover is attached and this lateral face is used to load or unload the various electrical components of the nodes into the base, and the same lateral face is then closed with the cover 320 or 420 for sealing the chamber 321, one skilled in the art would understand that these embodiments could also be modified to use a top face or a base face of the base 310 for the same reasons. In other words, it is possible to have the top face of the base 310 opened to load or unload the various electrical components and then close this top face with the cover 320 or 420. For the same reasons, it is possible to have the bottom face of the base opened and then to cover it with the cover 320 or 420. If this configuration is selected, then it is possible to have the plug 330 or 430 still formed on a lateral face of the base. In one variation, it is possible to have one face of the base used for loading and unloading the electronics and another face of the base for placing the connection plug 330 or 430. In other words, while the above embodiments use the cover 320 or 430 to both close the base and carry the electrical connections associated with the connection plug 330 or 430, these two functions can be dissociated and distributed on different faces of the base as desired by the operator, while still having the same base for both the DFU and AFU nodes. In addition, while the embodiments discussed herein have referred only to a MEMS sensor for the DFU node and a geophone sensor for the AFU node, it is possible to have other sensors in these nodes or externally connected to these nodes, or additional sensors. For example, in one application, it is possible to place a gravity sensor inside the base, either by itself, or on the sensor device 540, or on the main electronic board 510. Other sensors, like temperature sensor, may be placed inside the chamber 312.

Figure 20:
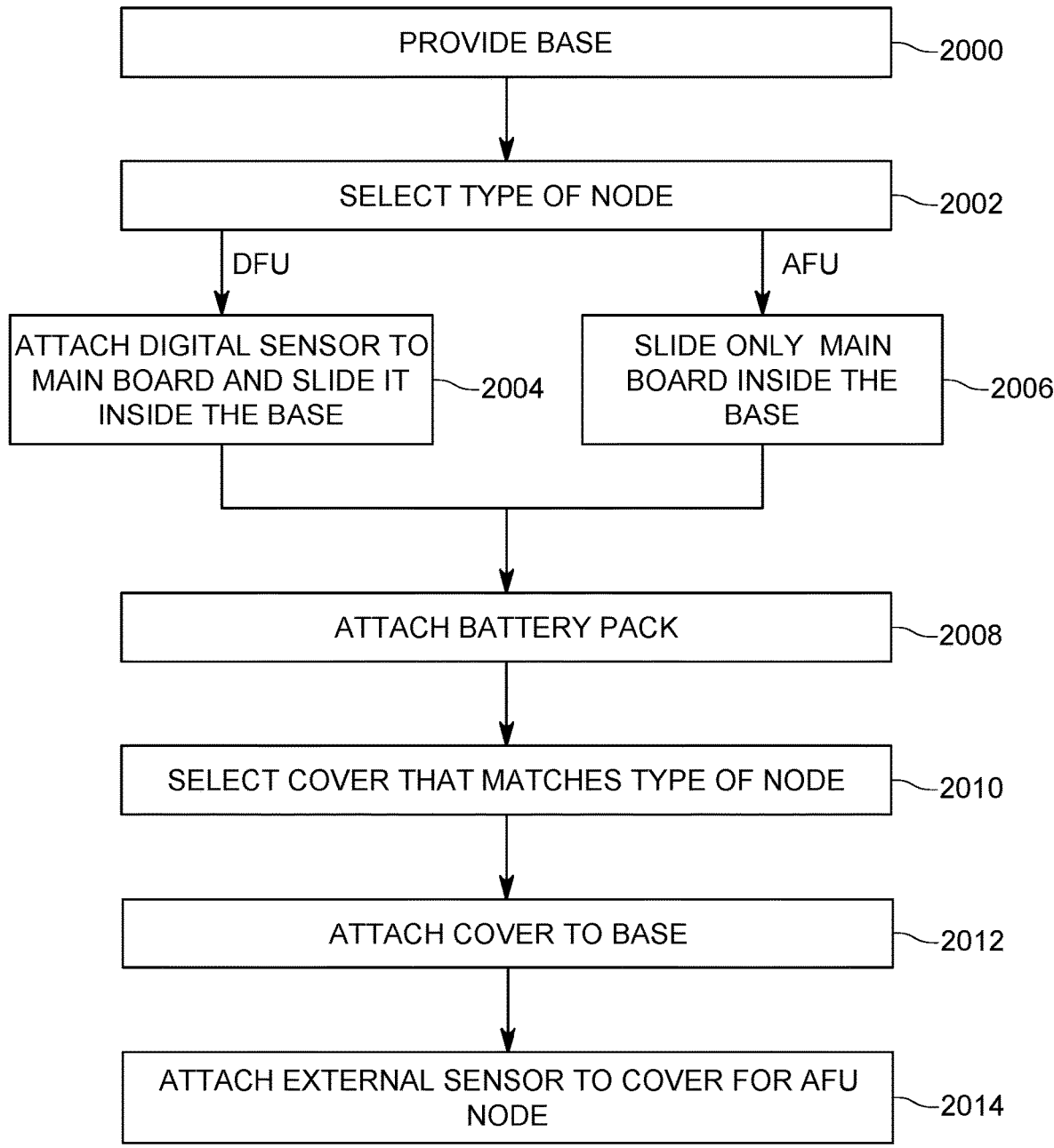
FIG. 20 is a flowchart of a method for assembling a seismic node using the common base regardless of the type of the node.

A method for assembling a seismic node, either a DFU or an AFU node, is now discussed with regard to FIG. 20. In step 2000, a base 310 is provided. The base 310, as discussed with regard to FIGS. 5 and 15, is the same for both nodes. In step 2002, a decision is made whether the base should be used for the DFU node or the AFU node. If the DFU node needs to be made, then in step 2004, a digital sensor is electrically attached to a main electronic board through a dedicated flexible cable, and this assembly is placed into the base, along a first guide. If the ADU node needs to be made, the main electronic board is slid in step 2006 into the base with no sensor attached to it. In step 2008, the battery pack is slid into the base, along a second guide, and also it is electrically connected with a flexible electric cable to the main electronic board, regardless of whether the DFU node or the AFU is assembled.

Figure 21:
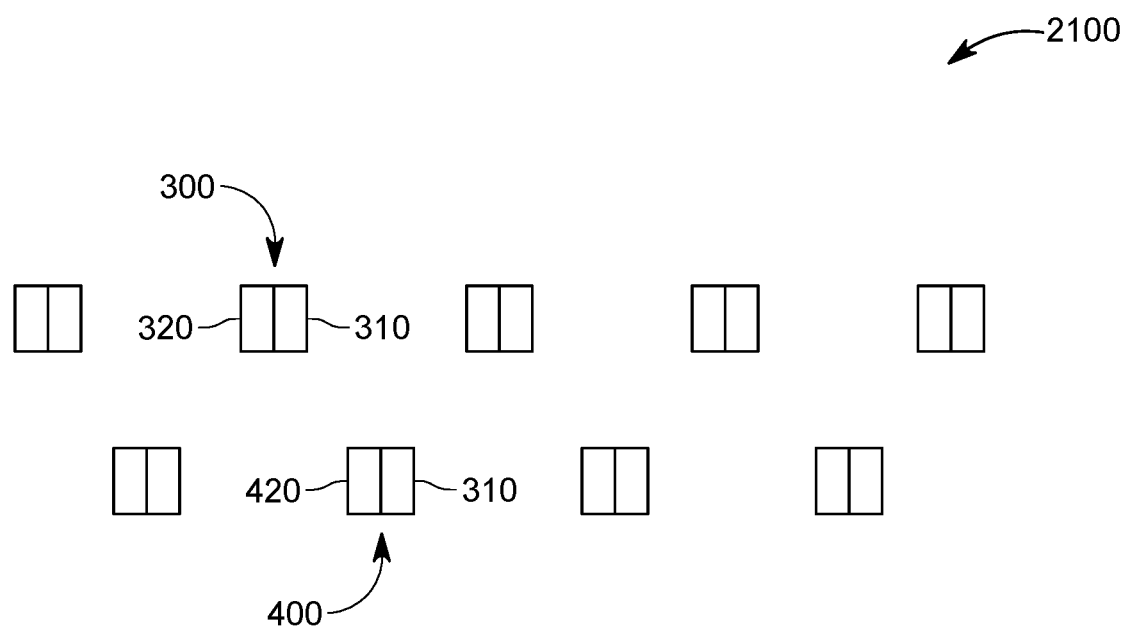
FIG. 21 illustrates a seismic acquisition system that includes digital and analog nodes.

In step 2010, a cover 320 or 430 is selected, depending of whether the node is a DFU or an AFU node. For the DFU node, the cover 320 is selected to have a connection plug 330 that only needs to fit a docking station, while for the AFU module, the cover 420 is selected to have a connection plug 430 that fits not only the docking module, but also an external analog sensor's connecting mechanism. In step 2012, the selected cover and a corresponding seal are attached with screws to the base 310, to fully seal the base, such that a chamber 312 in which the electronics is placed, does not communicate with the ambient environment. The cover may be attached with four screws to the base, as discussed above with regard to FIGS. 5 and 15. In step 2014, if the node is an AFU node, an external sensor 1800 is electrically and mechanically attached to the connection plug 430 of the cover 420. In this way, by using a common base 310, either a DFU node or an AFU node may be assembled with minimal components, and minimal assembly steps, which is advantageous for a seismic survey that involves between hundreds and thousands of nodes. Also, such a system reduces the cost of owning and maintaining the equipment associated with the seismic survey as the number of different elements is drastically reduced. Such a system 2100 is shown in FIG. 21 as including plural DFU nodes 300 and plural AFU nodes 400.

The disclosed embodiments provide a common platform (base) for different types of seismic nodes. To assembly a desired seismic node, a corresponding sensor and cover are different from one type of seismic node to another and they are selected during the assembly process. The electronics and battery pack that are placed inside the base are identical. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A wireless seismic node for collecting seismic data, the seismic node comprising:
a base configured to define a chamber having an open face;
a main electronic board having a processor, the main electronic board being placed inside the chamber and being configured to acquire the seismic data when either one of an analog seismic sensor, ASS, and a digital seismic sensor, DSS, is electrically connected to the main electronic board;
a battery pack configured to supply electrical power to the main electronic board, the battery pack being placed inside the chamber,
the base being configured to receive, at the open face, to seal the chamber, any of:
a digital cover that together with the DSS, which is located inside the chamber and attached to a wall of the base, forms a digital field unit, and
an analog cover that together with the ASS, which is electrically attached to the analog cover, forms an analog field unit, the analog cover being different from the digital cover.

2. The wireless seismic node of claim 1, wherein, when in use, the DSS is electrically connected with a flexible cable to the main electronic board.

3. The wireless seismic node of claim 2, wherein the DSS includes a microelectromechanical sensor.

4. The wireless seismic node of claim 2, wherein the main electronic board includes a global positioning module, a transceiver, and an antenna.

5. The wireless seismic node of claim 4, wherein the seismic node includes no additional transceivers and no additional antennas besides the transceiver and the antenna on the main electronic board.

6. The wireless seismic node of claim 2, wherein the digital cover includes first and second internal pins that face the chamber, and the first and second internal pins are configured to engage corresponding first and second flexible strips formed on the main electronic board.

7. The wireless seismic node of claim 6, wherein the digital cover further includes first and second external pins that extend outside of the chamber, and the first and second internal pins are electrically connected to the first and second external pins, respectively.

8. The wireless seismic node of claim 2, further comprising:
a spike configured to plant the seismic node into the ground, the spike being removably attached to the base.

9. The wireless seismic node of claim 2, further comprising:
dampers configured to enclose the battery pack;
a first guide formed in the chamber and configured to receive and guide the main electronic board; and
a second guide formed in the chamber and configured to receive and guide the dampers of the battery pack.

10. The wireless seismic node of claim 2, wherein the battery pack is located lower than the main electronic board, along gravity.

11. The wireless seismic node of claim 1, wherein, when the analog cover is used, the ASS is located outside the chamber, there is no other seismic sensor inside the chamber, and the ASS is a geophone.

12. The wireless seismic node of claim 11, wherein the main electronic board includes a global positioning module, a transceiver and an antenna.

13. The wireless seismic node of claim 12, wherein the seismic node includes no additional transceivers and no additional antennas besides the transceiver and the antenna on the main electronic board.

14. The wireless seismic node of claim 11, wherein the analog cover includes first and second internal pins that face the chamber, and the first and second internal pins are configured to engage corresponding first and second flexible strips attached to the main electronic board.

15. The wireless seismic node of claim 14, wherein the analog cover further includes an external pin and an external tubular member that face an outside of the chamber, and the first and second internal pins are electrically connected to the external pin and the external tubular member, respectively.

16. The wireless seismic node of claim 11, further comprising:
dampers configured to enclose the battery pack;
a first guide formed in the chamber and configured to receive and guide the main electronic board; and
a second guide formed in the chamber and configured to receive and guide the dampers of the battery pack.

17. The wireless seismic node of claim 11, wherein the battery pack is located lower than the main electronic board, along gravity.

18. A seismic acquisition system for collecting seismic data, the seismic acquisition system comprising:
a digital field unit, DFU, that collects a first set of seismic data; and
an analog field unit, AFU, that collects a second set of seismic data, wherein the DFU includes a first base, a digital cover and a digital seismic sensor, DSS, wherein the AFU includes a second base,
an analog cover different from the digital cover, and an analog seismic sensor, ASS, wherein the first base is identical to the second base,
both the first base and the second base being configured to define a chamber having an open side, respectively, the open side of the chamber being closed and sealed by the digital cover for the DFU, the DSS being attached to a wall inside the chamber of the first base, and the open side of the chamber being closed and sealed by the analog cover for the AFU, the ASS being located outside the chamber and being electrically attached to the analog cover;
wherein the first base and the second base are each configured to receive inside the chamber;
a main electronic board having a processor, the main electronic board being electrically connected to and configured to acquire the seismic data using either one of the ASS and the DSS; and a battery pack configured to supply electrical power to the main electronic board.

19. The system of claim 18, wherein the DSS includes a microelectromechanical sensor and the ASS includes a geophone.

* * * * *